US011594723B2

United States Patent
Isakin et al.

(10) Patent No.: US 11,594,723 B2
(45) Date of Patent: Feb. 28, 2023

(54) ZNO NANOPARTICLE COATED EXFOLIATED GRAPHITE COMPOSITE, METHOD OF PRODUCING COMPOSITE AND USE IN LI-ION BATTERY

(71) Applicant: ECKART GmbH, Hartenstein (DE)

(72) Inventors: Olga Isakin, Hartenstein (DE); Kerstin Schindler, Windhagen-Rederscheid (DE); Ralph Schneider, Hartenstein (DE); Ralf Moos, Bayreuth (DE); Monika Willert-Porada, Hartenstein (DE)

(73) Assignee: ECKART GmbH, Hartenstein (DE)

( * ) Notice: Subject to any disclaimer, the term of this patent is extended or adjusted under 35 U.S.C. 154(b) by 0 days.

(21) Appl. No.: 16/604,879

(22) PCT Filed: Dec. 21, 2017

(86) PCT No.: PCT/EP2017/084117
§ 371 (c)(1),
(2) Date: Oct. 11, 2019

(87) PCT Pub. No.: WO2018/188772
PCT Pub. Date: Oct. 18, 2018

(65) Prior Publication Data
US 2021/0143408 A1    May 13, 2021

(30) Foreign Application Priority Data
Apr. 13, 2019 (EP) ...................... 17000646

(51) Int. Cl.
*H01M 4/36* (2006.01)
*H01M 4/48* (2010.01)
(Continued)

(52) U.S. Cl.
CPC .......... *H01M 4/366* (2013.01); *H01M 4/364* (2013.01); *H01M 4/483* (2013.01); *H01M 4/587* (2013.01);
(Continued)

(58) Field of Classification Search
None
See application file for complete search history.

(56) References Cited

U.S. PATENT DOCUMENTS

| 5,888,430 A | 3/1999 | Wakayama et al. |
| 8,611,070 B2 | 12/2013 | Ivanovici et al. |

(Continued)

FOREIGN PATENT DOCUMENTS

| CA | 2354222 A1 | 1/2002 |
| CN | 101087021 A | 12/2007 |

(Continued)

OTHER PUBLICATIONS

Song et al., Graphene Decorated with ZnO Nanocrystals with Improved Electrochemical Properties Prepared by a Facile In Situ Hydrothermal Route, International Journal of Electrochemical Science, vol./Issue 7, pp. 2164-2174 (Year: 2012).*

(Continued)

*Primary Examiner* — Jayne L Mershon
(74) *Attorney, Agent, or Firm* — Fitch, Even, Tabin & Flannery LLP

(57) ABSTRACT

Composites comprising an exfoliated graphite support material having a degree of graphitization g in an range of 50 to 93%, obtained by XRD Rietveld analysis, which is coated with ZnO nanoparticles. These composites are produced by three different methods: A) (syn) the method comprises the following consecutive steps: i) a Zn(II)salt is dissolved in a solvent ii) graphite and a base are added simultaneously iii) the mixture is stirred under impact of ultrasound iv) the (Continued)

Figure 1:
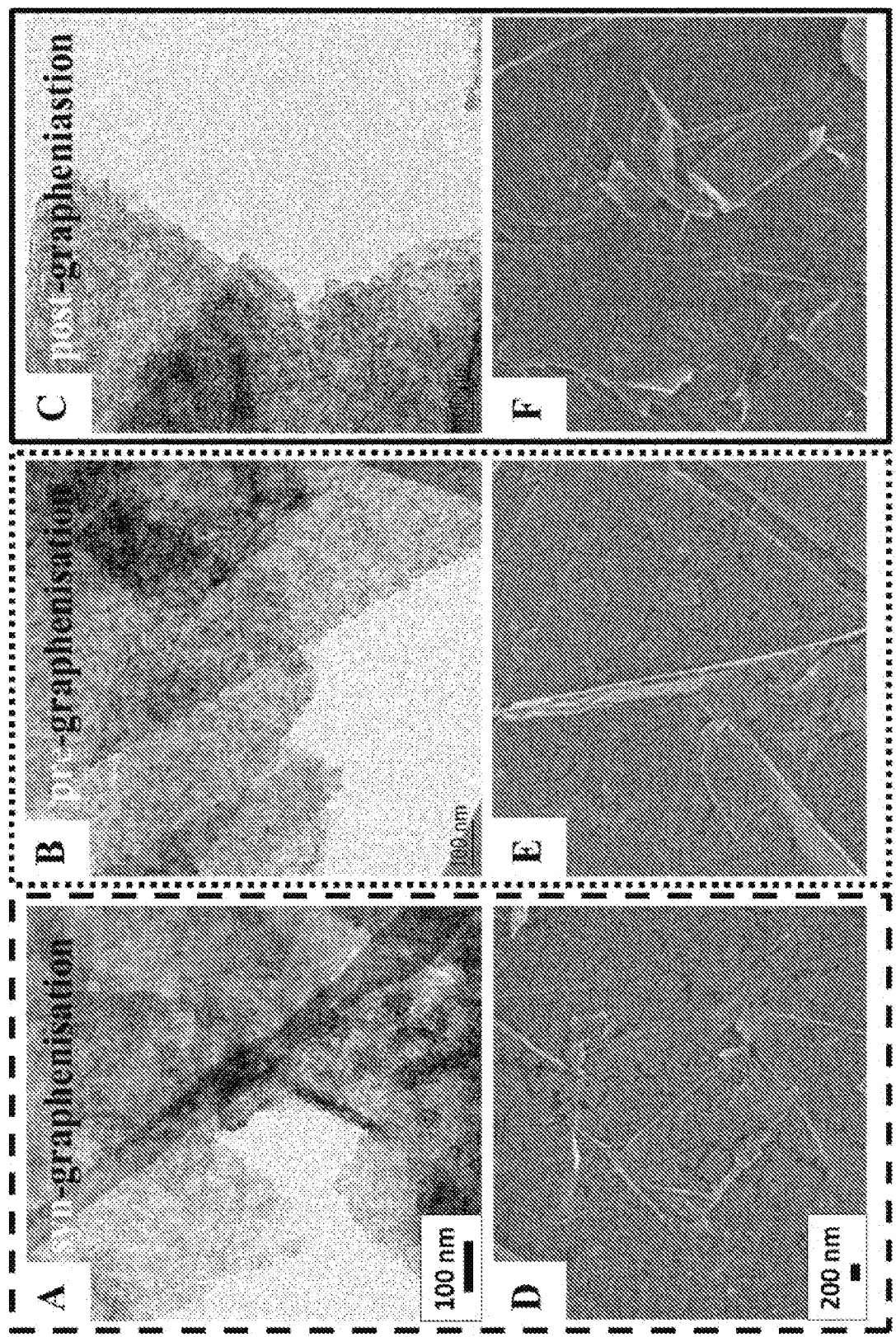

solvent is removed from the suspension or B) (pre) the method comprises the following consecutive steps: i) graphite is suspended in a solvent and exfoliated via impact of ultrasound ii) a Zn(II)salt and a base are added simultaneously forming nano-ZnO particles iii) the mixture is stirred iv) the solvent is removed from the suspension or C) (post) the method comprises the following steps: i) a Zn(II)salt and a base are mixed in a solvent in a first reactor forming nano-ZnO particles ii) graphite is exfoliated via impact of ultrasound in a second reactor iii) both suspensions of i) and ii) are mixed together iv) after step iii) the solvent is removed from the suspension. These coated composites may be tempered in a further step and again coated and again tempered.

22 Claims, 18 Drawing Sheets

(51) Int. Cl.
   H01M 4/587      (2010.01)
   H01M 10/0525    (2010.01)
   H01M 4/02       (2006.01)
(52) U.S. Cl.
   CPC .. *H01M 10/0525* (2013.01); *H01M 2004/021* (2013.01); *H01M 2004/027* (2013.01)

(56) References Cited

U.S. PATENT DOCUMENTS

| | | |
|---|---|---|
| 8,852,809 B2 | 10/2014 | Sheem et al. |
| 9,221,686 B2 | 12/2015 | Muramatsu et al. |
| 2006/0062716 A1 | 3/2006 | Zaghib et al. |
| 2011/0292570 A1 | 12/2011 | Ivanovici et al. |
| 2013/0052526 A1 | 2/2013 | Momo et al. |
| 2014/0054490 A1 | 2/2014 | Sundara et al. |
| 2016/0168726 A1 | 6/2016 | Dryfe et al. |
| 2016/0236939 A1 | 8/2016 | De Miguel Turullois et al. |
| 2016/0301096 A1* | 10/2016 | Zhamu ............... H01M 10/0568 |

FOREIGN PATENT DOCUMENTS

| | | |
|---|---|---|
| CN | 101425580 A | 5/2009 |
| CN | 103734188 A | 4/2014 |
| CN | 104801292 A | 7/2015 |
| CN | 105244502 A | 1/2016 |
| CN | 105552338 A | 5/2016 |
| JP | H09249407 A | 9/1997 |
| JP | 2002141069 A | 5/2002 |
| JP | 2013065837 A | 4/2013 |
| JP | 2016534958 A | 11/2016 |
| KR | 20160040688 A | 4/2016 |
| WO | 2013168544 A1 | 11/2013 |

OTHER PUBLICATIONS

Hou et al., Influence of order degree of coaly graphite on its structure change during preparation of graphene oxide, for evidence only, Journal of Materiomics, vol./Issue 6, pp. 628-641 (Year: 2020).*

International Search Report and Written Opinion for International Application No. PCT/EP2017/084117 dated Mar. 20, 2018.

Extended European Search Report for European U.S. Appl. No. 17/000,646 dated Oct. 13, 2017.

Zhang et al., "Capacitive behavior of graphene-ZnO composite film for supercapacitors," Journal of Electroanalytical Chemistry 634, pp. 68-71, dated Sep. 1, 2009.

Hsieh et al., "Synthesis of ZnO@Graphene composites as anode materials foriithium ion batteries," Electrochimica Acta 111, pp. 359-365, dated 2013.

Song et al., "Reduced graphene oxide/ZnO nanohybrids: Metallic Zn powderinduced one-step synthesis for enhanced photocurrent andphotocatalytic response," Applied Surface Science 353, pp. 580-587, dated Jun. 22, 2015.

Hummers, Jr. et al., "Preparation of Graphitic Oxide," Journal of the American Chemical Society, 80, p. 1339, dated Mar. 20, 1958.

Muhammad Mohsin Hossain et al., "Synthesis of an efficient white-light photocatalyst composite of graphene and ZnO nanoparticles: Application to methylene blue dye decomposition", Applied Surface Science (2015), pp. 1-11.

Hongmei Fang et al., "Facile and large-scale preparation of sandwich-structured graphene-metal oxide compositions as anode materials for Li-ion batteries", Electrochimica Acta 186 (2015), pp. 397-403.

Ye Lin, et al., "One-pot Hydrothermal Synthesis of ZnO microsheres/Graphene Hybrid and its Electrochemical performance", Int. J. Electrochem. Sci, 11 (2016), pp. 7726-7735.

Rajni Sharma, et al., "ZnO anchored graphene hydrophobic nanocomposite-based bulk heterojunction solar cells ahowing anhanced short-circuit current", J. Mater. Chem. C (2014), pp. 8142-8151.

Xueyang Shen, et al., "Enhanced Electrochemical Performance of ZnO-Loaded/Porous Carbon Composite as Anode materials for Lithium ion batteries", ACS Appl. Mater. Interfaces (2013), pp. 3118-3125.

Sungun Wi, et al., "Reduced graphene oxide/carbon double-coated 3-D porous ZnO aggregates as high-performance Li-ion anode materials", Nanoscale Research Letters (2015) 10:204, pp. 1-8.

Changlei Xiao, et al., "ZnO nanoparticle encapsulated in a 3D hierarchical carbon framework as anode for lithium ion battery", Electrochim. Acta 189 (2016), pp. 245-251.

Yan Zhao, et al., "One pot synthesis of radial ZnO microparticles deposited on graphene nanosheets as the Anode materials for Lithium-ion Batteries", Int. J. Electrochem. Sci., 1 (2016) pp. 3179-3189.

Agnese Birrozzi, et al., "High-stability graphene nano sheets/SnO2composite anode forlithium ion batteries", Electrochimica Acta 137 (2014) pp. 228-234.

V.A. Davydov, et al., "Conversion of polycyclic aromatic hydrocarbons to graphite and diamond at high pressures", Carbon 42 (2004) pp. 261-269.

Wei Hong, et al. "One-pot hydrothermal synthesis of Zinc ferrite/reduced graphene oxide as an efficient electrocatalyst for oxygen reduction reaction", Journal of Colloid and Interface Science 485 (2017) pp. 175-182.

P. Schaaf, et al., "Surface exclusion effects in adsorption processes", The Journal of Chemical Physics 91 (1989) pp. 4401-4409.

Pierre Schaaf, et al., "From Random Sequential Adsorption to Ballistic Deposition: A General View of Irreversible Deposition Processes", J. Phys. Chem. B,104 (2000) pp. 2204-2214.

Yueh-Ting Shih, et al., "A study at room temperature and 55 ° C. on the charge-discharge characteristics of Si(100-x)Alx thin film anode for Li-ion batteries", Surface & Coatings Technology 215 (2013) pp. 79-84.

Qingmei Su, et al., "Visualizing the electrochemical reaction of ZnO nanoparticles with lithium by in situ TEM: two reaction modes are revealed", Nanotechnology 24 (2013) 255705, pp. 1-6.

Jun Wu, et al., "Enhanced electrochemical performance of nanosheet ZnO/reducedgraphene oxide composites as anode for lithium-ion batteries", Colloids and Surfaces A: Physicochem. Eng. Aspects 468 (2015) pp. 17-21.

Y.S. Yoon, et al., "Nano Si-coated graphite composite anode synthesized by semi-mass production ball milling for lithium secondary batteries", Surface & Coatings Technology 206 (2011) pp. 553-558.

Jian Zhang, et al., "High performance of electrochemical lithium storage batteries: ZnO-based nanomaterials for lithium-ion and lithium-sulfur batteries", Nanoscale, (2016), 8, pp. 18578-18595.

Li Zhao, et al., "Sandwich-Structured Graphene-Fe3O4@Carbon Nanocomposites for High-Performance Lithium-Ion Batteries", ACS Appl. Mater. Interfaces, Apr. 17, 2015, pp. 1-22.

Zhou Xingfu, et al., "Microspheric Organization of Multilayered ZnO Nanosheets with Hierarchically Porous Structures", J. Phys. Chem. C (2008) 112, pp. 11722-11728.

(56) References Cited

OTHER PUBLICATIONS

Detlef W. Bahnemann et al., "Preparation and Characterization of Quantum Size Zinc Oxide: A Detailed Spectroscopic Study", J. Phys. Chem. (1987) 91, pp. 3789-3798.
Athanasios B. Bourlinos, et al., "Graphite Oxide: Chemical Reduction to Graphite and Surface Modification with Primary Aliphatic Amines and Amino Acids", Langmuir (2003) 19, pp. 6050-6055.
Scott Gilje, et al., "A Chemical Route to Graphene for Device Applications", Nano Letters, vol. 7, No. 11 (2007), pp. 3394-3398.
Rong Guo, et al., "Graphene-encapsulated porous carbon-ZnO composites ashigh-performance anode materials for Li-ion batteries", Electrochimica Acta 135 (2014) pp. 161-167.
Eric A. Meulenkamp, "Synthesis and Growth of ZnO Nanoparticles", J. Phys. Chem. B (1998) 102, pp. 5566-5572.
Eliana Quartarone, et al., "Graphite-coated ZnO nanosheets as high-capacity, highly stable, and binder-free anodes for lithium-ion batteries", Journal of Power Sources 320 (2016) pp. 314-321.
Babasaheb R. Sankapal, et al., "Zinc Oxide Encapsulated Carbon Nanotube Thin Films for Energy Storage Applications", Electrochimica Acta 192 (2016) pp. 377-384.
Wen-Tao Song, et al., Graphene Decorated with ZnO Nanocrystals with Improved Electrochemical Properties Prepared by a Facile In Situ Hydrothermal Route, Int. J. Electrochem. Sci., 7 (2012) pp. 2164-2174.
Xiang Sun, et al., "Synthesis of ZnO quantum dot/graphene nanocomposites by atomic layer deposition with high lithium storage capacity", J. Mater. Chem. A, (2014) pp. 7319-7326.
Youlan Zou, et al., "MWCNTs enhanced ZnO nanoparticles as anode for lithium ion batteries", Materials Letters 199 (2017) pp. 57-60.
Shilpa et al., "Electrospun hollow glassy carbon-reduced graphene oxide nanofibers with encapsulated ZnO nanoparticles: a free standing anode for Li-ion batteries", J. Mater. Chem. A (2015) pp. 1-8.
Chao Zhang, et al., "Role of oxygen vacancy in tuning of optical, electrical and $NO_2$ sensingproperties of $ZnO_{1-x}$coatings at room temperature", Sensors and Actuators B 248 (2017) pp. 886-893.
Chien-Te Hsieh, et al., "Synthesis of ZnO@Graphene composites as anode materials foriithium ion batteries", Electrochimica Acta 111 (2013) pp. 359-365.
Yanping Zhang, et al., "Capacitive behavior of graphene-ZnO composite film for supercapacitors", Journal of Electroanalytical Chemistry 634 (2009) pp. 68-71.
Chungho Kim, et al., "Graphene Oxide Assisted Synthesis of Self-assembled Zinc Oxide for Lithium-Ion-Battery anode", Chemistry of Materials (2016) pp. 1-9.
Taegyeong Kim, et al., "ZnO-Embedded N-Doped Porous Carbon Nanocomposite as a Superior Anode Material for Lithium-Ion Batteries", Electrochimica Acta (2017) pp. 1-33.
Zhimin Ren, et al., "Preparation of Carbon-Encapsulated ZnO Tetrahedron as an Anode Material for Ultralong Cycle Life Performance Lithium-ion Batteries", Electrochimica Acta 146 (2014) pp. 52-59.
Chien-Te Hsieh et al., "Improved storage capacity and rate capability of $Fe_3O_4$—graphene anodes for lithium-ion batteries," Electrochimica Acta 58 (2011) 119-124.

\* cited by examiner

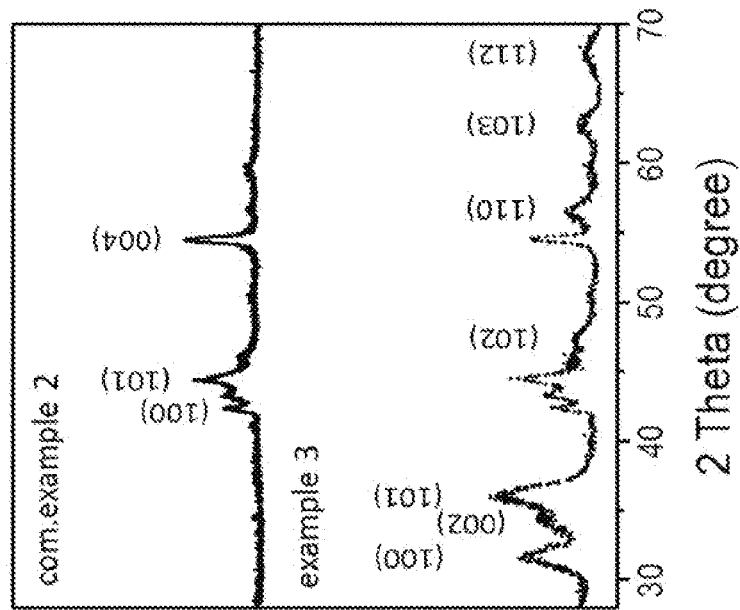
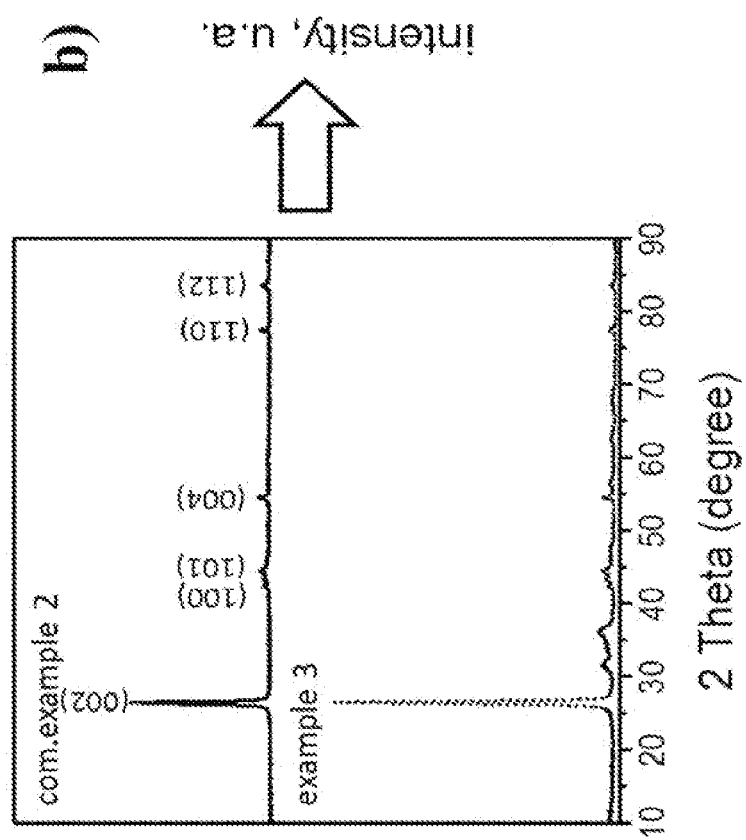
Fig. 8A
Fig. 8B

ZNO NANOPARTICLE COATED EXFOLIATED GRAPHITE COMPOSITE, METHOD OF PRODUCING COMPOSITE AND USE IN LI-ION BATTERY

This invention deals with composites of ZnO nanoparticles and exfoliated graphite, methods of their production and their use, especially as anode material for lithium-ion batteries.

Enormous growth in fossil fuel consumption in past decades has led to many serious environmental problems. Secondary batteries are an important class of electrochemical energy storage devices which may help to release these problems in a future energy system based on non-fossil fuel concepts.

Among the most promising applications of rechargeable battery applications are lithium-ion batteries (LIB). Presently commercially available LIB's have an anode based on graphite material. Here the following reactions take place:

$$xLi^+ + C_n + xe^- \leftrightarrow Li_xC_n \text{ Theoretical Capacity: 370 mAhg}^{-1} \quad (I)$$

These batteries have proved to be operable under real conditions, but the capacities are still too low. Therefore, current graphite anode cannot satisfy the energy and power requirements of future devices. Many research groups extensively investigated metal oxides as anode materials with large theoretical capacities and high energy densities. (Shih, Y. T.; Wu, C. H.; Hung, F. Y.; Lui, T. S.; Chen, L. H., A study at room temperature and 55 degrees C. on the charge-discharge characteristics of $Si_{(100-x)}Al_x$ thin film anode for Li-ion batteries. *Surface & Coatings Technology* 2013, 215, 79-84 and Birrozzi, A.; Raccichini, R.; Nobili, F.; Marinaro, M.; Tossici, R.; Marassi, R., High-stability graphene nano sheets/$SnO_2$ composite anode for lithium ion batteries. *Electrochim. Acta* 2014, 137, 228-234 and Wu, J.; Chen, C. H.; Hao, Y.; Wang, C. L., Enhanced electrochemical performance of nano sheet ZnO/reduced graphene oxide composites as anode for lithium-ion batteries. *Colloid Surf. A-Physicochem. Eng. Asp.* 2015, 468, 17-21).

Amongst other materials ZnO is a material with interesting perspective as this material has a much higher theoretical capacity. The following reactions are involved:

$$\text{Conversion reaction: } ZnO + 2Li^+ + 2e^- \leftrightarrow Zn + Li_2O \quad (II)$$

$$\text{Alloying-dealloying reaction: } Zn + Li^+ + e^- \leftrightarrow LiZn \quad (III)$$

The theoretical capacity of ZnO is 978 mAhg$^{-1}$ and therefore much higher than graphite.

Furthermore, ZnO has environmental benignity, a good chemical stability and is a low cost material. However, in spite of these advantages, ZnO exhibits poor electrical conductivity and large volume expansion of 228% during lithiation and structure changes during the lithiation/delithiation process. These drawbacks usually lead to a strong capacity fading after a certain number of electrochemical cycles.

However, the carbonaceous sheets assembled between the nanoparticles of ZnO induce a puffer layer during volume expansion and shrinkage, respectively (Guo, R.; Yue, W. B.; An, Y. M.; Ren, Y.; Yan, X., Graphene-encapsulated porous carbon-ZnO composites as high-performance anode materials for Li-ion batteries. *Electrochim. Acta* 2014, 135, 161-167 and Zhao, L.; Gao, M. M.; Yue, W. B.; Jiang, Y.; Wang, Y.; Ren, Y.; Hu, F. Q., Sandwich-Structured Graphene-$Fe_3O_4$@Carbon Nanocomposites for High-Performance).

Hence, it is possible to enhance the capacity due to the composite formation including both materials (Sun, X.; Zhou, C. G.; Xie, M.; Sun, H. T.; Hu, T.; Lu, F. Y.; Scott, S. M.; George, S. M.; Lian, J., Synthesis of ZnO quantum dot/graphene nanocomposites by atomic layer deposition with high lithium storage capacity. *J. Mater. Chem. A* 2014, 2 (20), 7319-7326 and Yoon, Y. S.; Jee, S. H.; Lee, S. H.; Nam, S. C., Nano Si-coated graphite composite anode synthesized by semi-mass production ball milling for lithium secondary batteries. *Surface & Coatings Technology* 2011, 206 (2-3), 553-558).

Much work has been done to replace graphite by graphene in composites with ZnO nanoparticles. A review is given in Jian Zhang, Peng Gu, Jing Xu, Huaiguo Xue, Huan Pang, *Nanoscale*, 2016, 8, 18578-18595.

It is known from literature that most common composites are based on graphene oxide (GO) produced from graphite by a Hummer's method. (Hsieh, C. T.; Lin, C. Y.; Chen, Y. F.; Lin, J. S., Synthesis of ZnO@Graphene composites as anode materials for lithium ion batteries. *Electrochim. Acta* 2013, 111, 359-365. Herein it is disclosed that oxidized Graphene exhibits a significant increase in the (002) lattice spacing.

Similar disclosure are: Song, W. T.; Xie, J.; Liu, S. Y.; Zheng, Y. X.; Cao, G. S.; Zhu, T. J.; Zhao, X. B., Graphene Decorated with ZnO Nanocrystals with Improved Electrochemical Properties Prepared by a Facile In Situ Hydrothermal Route. *Int. J. Electrochem. Sci.* 2012, 7 (3), 2164-2174 and Su, Q. M.; Dong, Z. M.; Zhang, J.; Du, G. H.; Xu, B. S., Visualizing the electrochemical reaction of ZnO nanoparticles with lithium by in situ TEM: two reaction modes are revealed. *Nanotechnology* 2013, 24 (25)).

The application of strong oxidizing agents such as sulfuric acid, sodium nitrate, potassium permanganate and hydrogen peroxide induces the formation of GO with functional groups such as hydroxy, ketone, carboxyl and epoxy. (Zhang, Y. P.; Li, H. B.; Pan, L. K.; Lu, T.; Sun, Z., Capacitive behavior of graphene-ZnO composite film for supercapacitors. *J. Electroanal. Chem.* 2009, 634 (1), 68-71).

The generated functional groups induce an increase of initial lattice space between the single graphene layers from 0.34 nm to 0.74 nm (Song, N.; Fan, H. Q.; Tian, H. L., Reduced graphene oxide/ZnO nanohybrids: Metallic Zn powder induced one-step synthesis for enhanced photocurrent and photocatalytic response. *Appl. Surf. Sci.* 2015, 353, 580-587).

Furthermore, sp$^2$ hybridization of carbon atoms changes into the spa hybridization which induces a strong loss of electrical conductivity. The further step for the composite formation involves the addition of the zinc salt to the GO followed by a reduction step. The reduction step can be performed due to addition of chemical agent like sodium borohydride, hydroquinone (both described in Bourlinos, A. B.; Gournis, D.; Petridis, D.; Szabo, T.; Szeri, A.; Dekany, I., Graphite oxide: Chemical reduction to graphite and surface modification with primary aliphatic amines and amino acids. *Langmuir* 2003, 19 (15), 6050-6055), hydrazine (Gilje, S.; Han, S.; Wang, M.; Wang, K. L.; Kaner, R. B., A chemical route to graphene for device applications. *Nano Lett.* 2007, 7 (11), 3394-3398) or thermal reduction (Zhang, Y. P.; Li, H. B.; Pan, L. K.; Lu, T.; Sun, Z., Capacitive behavior of graphene-ZnO composite film for supercapacitors. *J. Electroanal. Chem.* 2009, 634 (1), 68-71), respectively. The end product is ZnO coated reduced graphene oxide (rGO), which exhibits an increased amount of sp$^2$ hybridized carbon atoms, associates increase of conductivity and enhanced capacity. However, several problems such as absence of homogeneous coating, high toxicity of used chemical agents, low-yield and high cost make the production process not suitable for an industrial production scale.

CN 103734188 A discloses a method of a zinc oxide coated graphene oxide. The zinc oxide is formed by a soft chemical method based on the reaction of a divalent zinc ion with alkali in alcoholic solution. The composites exhibit good properties as disinfection means.

In E. Quatrarone, V. Dall'Asta, A. Resmini, C. Tealdi, I. G. Tredici, U. A. Tamburini, P. Mustarelli, *Journal of Power Sources* 320 (2016) 314-321 it was reported to coat ZnO nanosheets with "graphite" layer of thicknesses of 11 or 35 nm. In fact such thin layers may not be called to be graphite any more. Quite high capacities of around 600 mAhg$^{-1}$ were obtained after 100 cycles from these model electrodes. However, the ZnO nanosheets were produced by a hydrothermal method on stainless steel substrates which had been coated with a platinum layer of 200 nm thickness prior to ZnO deposition. Such electrode arrangement may not be accessible in an industrial scale. The platinum coated stainless steel substrate will not be used in an industrial electrode as being too expensive and technologically impractical.

It is therefore an object of this invention to find a composite material of ZnO nanoparticles and a carbon based material without the drawbacks mentioned above. It should be produced in a simple way, be based on easily accessible raw materials, can be easily handled as powder or paste and exhibits advanced electrochemical performance as anode material for Li-ionic cells compared to graphite. Furthermore, it is an object to find possible precursor composite materials for the final composite.

It is a further object of the invention to find a method of producing such a composite ZnO/carbon material by a simple, scalable, harmless, low cost and high-yield synthesis route of uniformly coated ZnO nanoparticles on the surface of an easily accessible carbon based material.

It is a further object of this invention to use the composites in battery technology.

This objects were solved by providing a composite comprising an exfoliated graphite support material having a degree of graphitization g in an range of 50 to 93%, obtained by XRD Rietveld analysis, wherein g is determined by the formula (IV):

$$g = \frac{d_{ng} - d_{002}}{d_{ng} - d_g} \quad (IV)$$

wherein $d_{002}$ is the distance of the lattice planes determined of the measured position of the (002) reflex and calculated according to the Bragg equation, $d_g$=335.4 pm which is a literature value for totally graphitized carbon and $d_{ng}$ represents non-graphitized carbon with a value of 344 pm, wherein said exfoliated graphite support material is coated with ZnO nanoparticles.

In claims 2 to 16 preferred embodiments of these composites are depicted.

Especially in claim 7 preferred composites of type a) or b) are depicted.

The objects were further solved by providing methods of producing a primary coated composite
a) characterized in that
A) (syn) the method comprises the following consecutive steps:
i) a Zn(II)salt is dissolved in a solvent
ii) graphite and a base are added simultaneously
iii) the mixture is stirred under impact of ultrasound
iv) the solvent is removed from the suspension
or
B) (pre) the method comprises the following consecutive steps:
i) graphite is suspended in a solvent and exfoliated via impact of ultrasound
ii) a Zn(II)salt and a base are added simultaneously forming nano-ZnO particles
iii) the mixture is stirred
iv) the solvent is removed from the suspension
or
C) (post) the method comprises the following steps:
i) a Zn(II)salt and a base are mixed in a solvent in a first reactor forming nano-ZnO particles
ii) graphite is exfoliated via impact of ultrasound in a second reactor
iii) both suspensions of i) and ii) are mixed together
iv) after step iii) the solvent is removed from the suspension.

The objects were further solved by a method of producing primary tempered composites b), wherein the primary coated composite a) produced by the methods A), B) or C) is tempered at a temperature in a range of 420° C. to 750° C. in an inert atmosphere or is tempered at a temperature in a range of 375° C. to 700° C. in a reducing atmosphere.

In claims 19 and 20 preferred embodiments of this method are depicted.

DETAILED DESCRIPTION

For this invention the following definitions or abbreviations are used:

Exfoliated graphite was sometimes abbreviated as "EG" throughout this invention.

Nanoparticles was sometimes abbreviated as "NP" or "NPs" throughout this invention.

Composites from exfoliated graphite and ZnO nanoparticles were sometimes abbreviated as ZnO@EG throughout this invention.

"TEM" denotes to Transmission electron microscopy.

"SEM" denotes to scanning electron microscopy.

"TC" denotes to texture coefficients derived from XRD signals

"ZnO nanoparticles" means nanoparticles composed of ZnO. They include also zinc oxides with a substoichiometrical amount of oxygen and also zinc oxides which are doped with other metal elements in certain amounts. Preferred metals are metals with an oxidation state (Ill), such as for example aluminum, iron or chromium. Also included are ZnO nanoparticles with domains of elemental zinc.

"Nanoparticles" are understood to denote to particles, especially ZnO particles, having an average particle size of below 100 nm.

With "Capacity" is meant to be the specific capacity, i.e. the capacity for 1 g of composite material, if not indicated otherwise.

LIST OF FIGURES

FIG. 1: SEM and TEM pictures of Examples 1 to 3.

Figure 2:
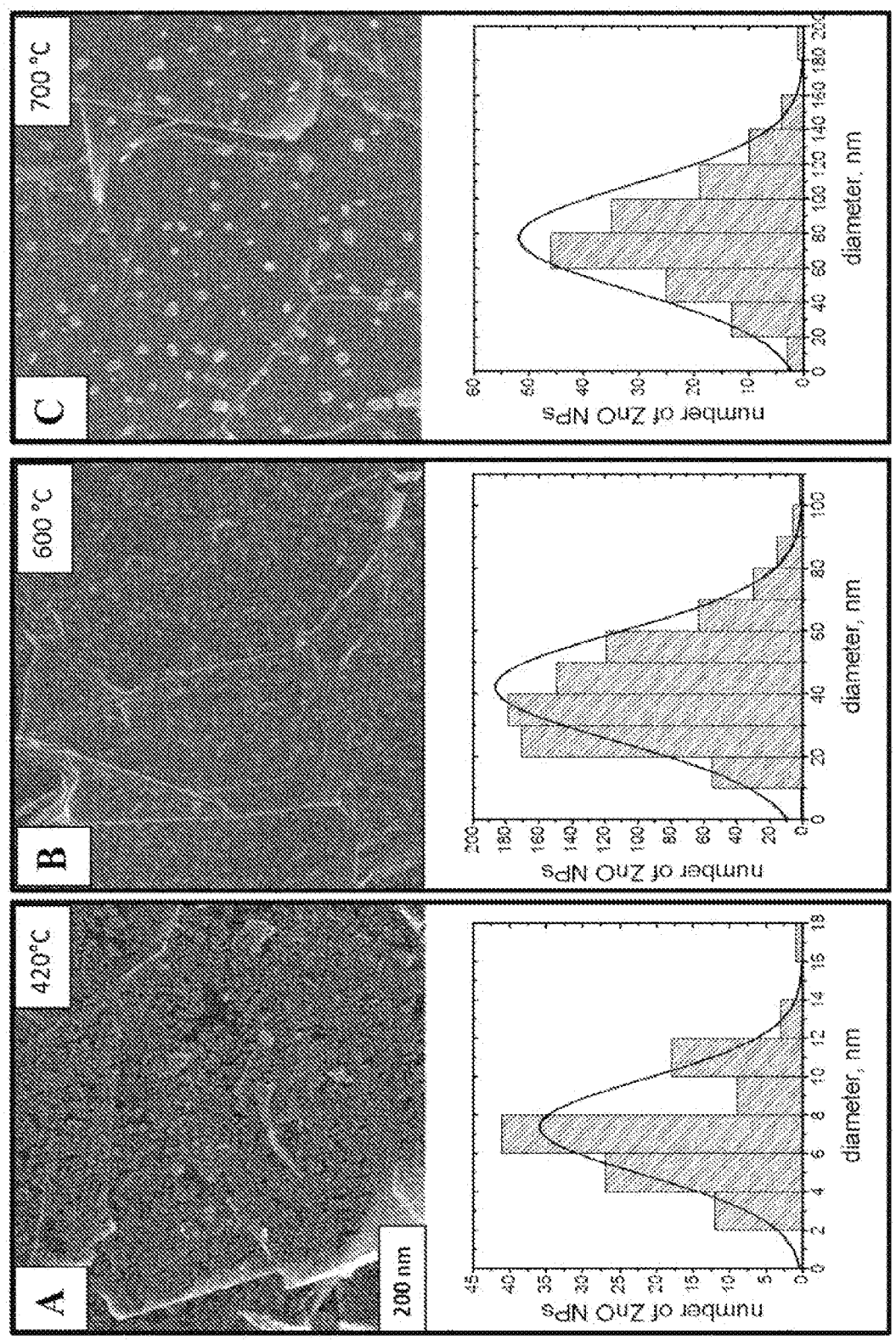

FIG. 2: SEM pictures and histograms of size distributions of selected examples of primary coated and tempered examples (Examples 4, 7 and 9) are shown.

Figure 3B:
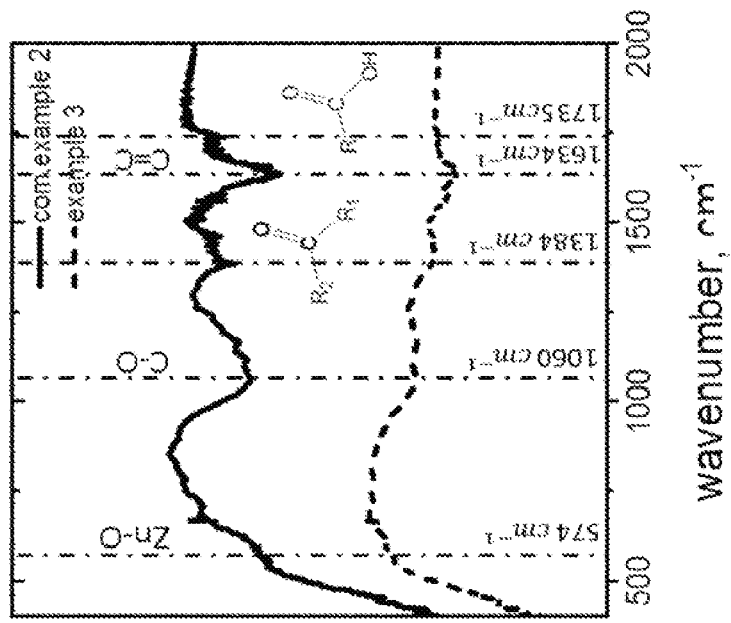

FIG. 3: FTIR spectra of exfoliated graphite (Comparative Example 2) and of composite (Example 3) are shown with a zoom in to selected wavelength and indication of vibrations their assignments.

Figures 4A, 4B:
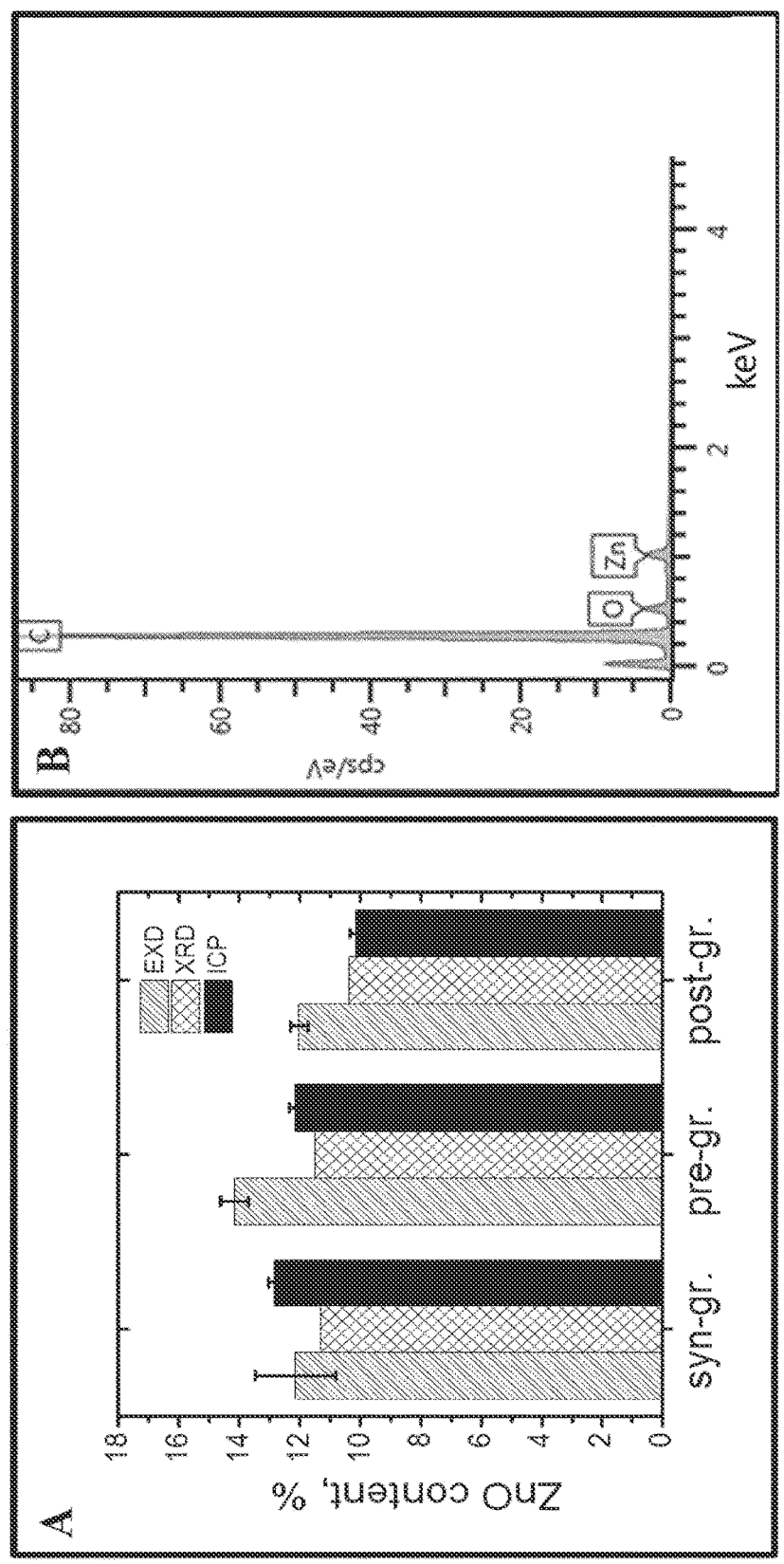

FIG. 4A: Results of the ZnO content in wt.-% of the composites of Examples 1 to 3 determined by various methods.

FIG. 4B: Exemplary EDX spectrum for example 3.

Figure 5:
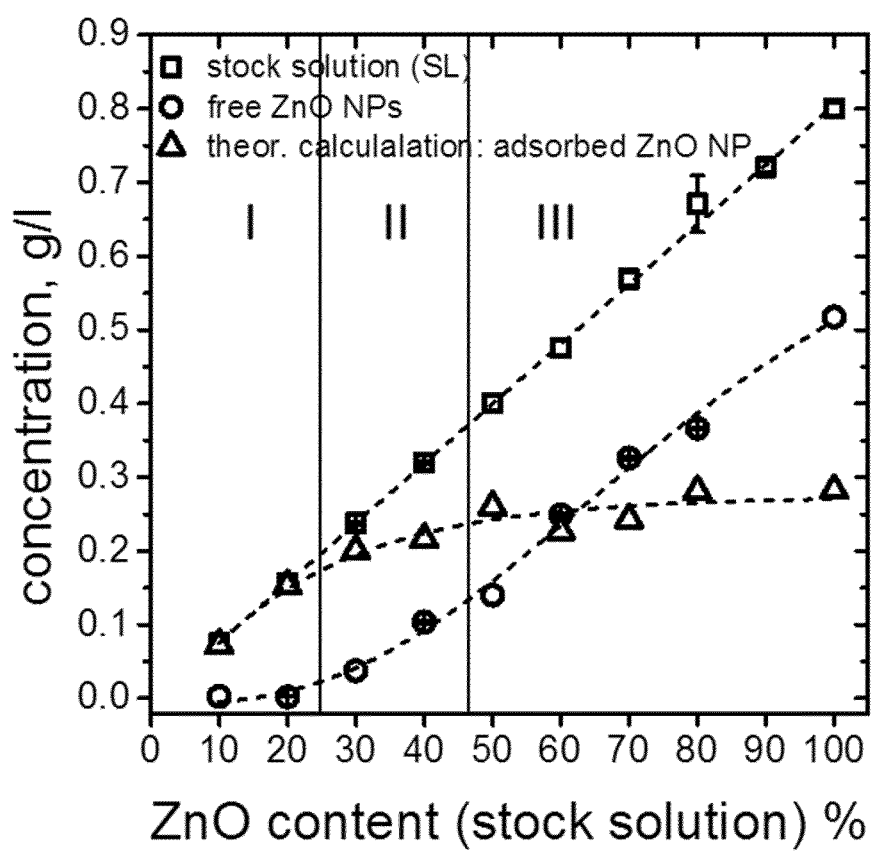

FIG. 5: ZnO NPs concentration in the initial diluted stock solutions and concentration of free ZnO NPs after adsorption determined using ICP-OES. Calculated theoretical values of adsorbed ZnO NPs, dividing into the three domains: complete adsorption domain (I), intermediate domain (II) and saturated domain (III), respectively. The dotted lines are a guide for the eye, which shows the behavior for each curve.

Figure 6:
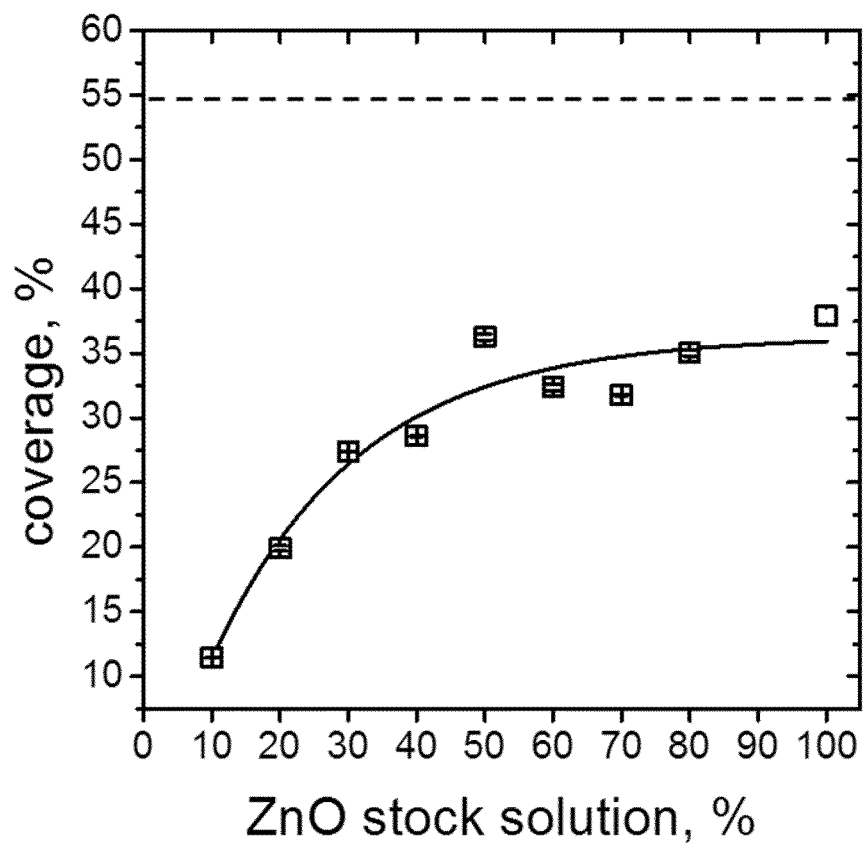

FIG. 6: Surface coverage of ZnO@EG composites (Examples 3-30 as a function of applied diluted ZnO NPs stock solution. The dotted line indicates the jamming limit of 54%.

Figure 7:
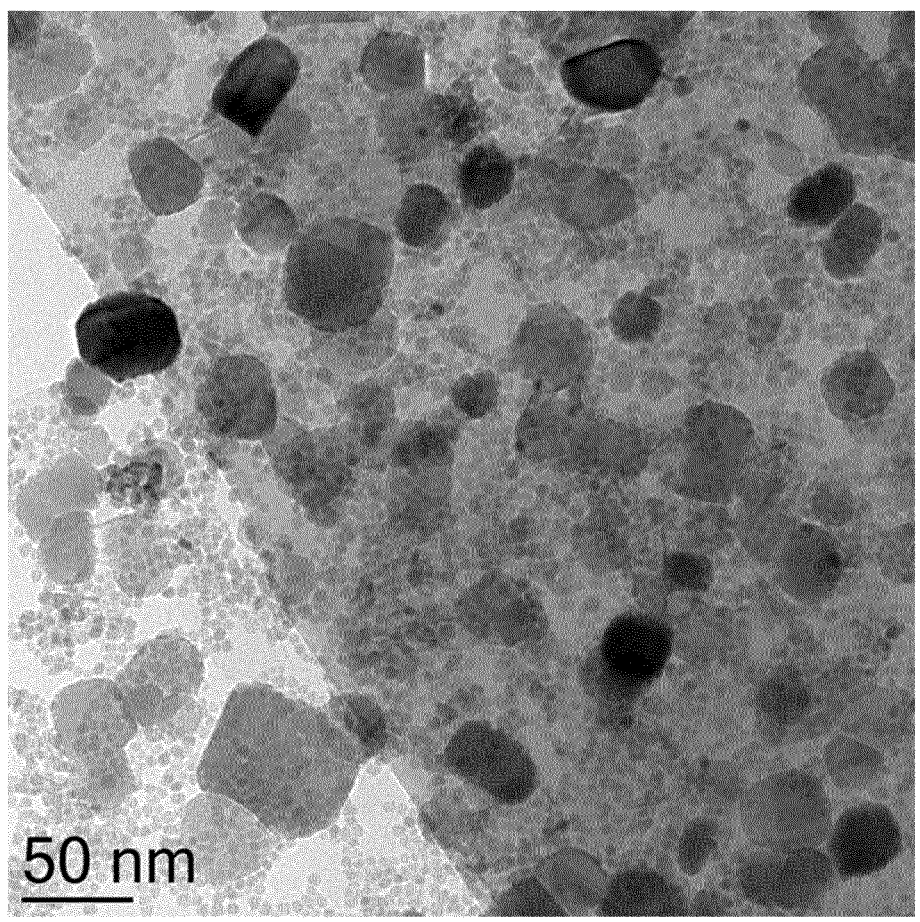

FIG. 7: Exemplary TEM picture of Example 7. The two different particle sizes of the tempered particles and the freshly coated particles can be separated well due to their difference in size and form. The small fresh particles are rather spherical while the tempered, larger particles tend to different morphology.

FIG. 8: a) Exemplary XRD spectra of EG (Comparative Example 2) and as prepared ZnO@EG (Example 3) composite with corresponding b) zoom in.

Figure 9:
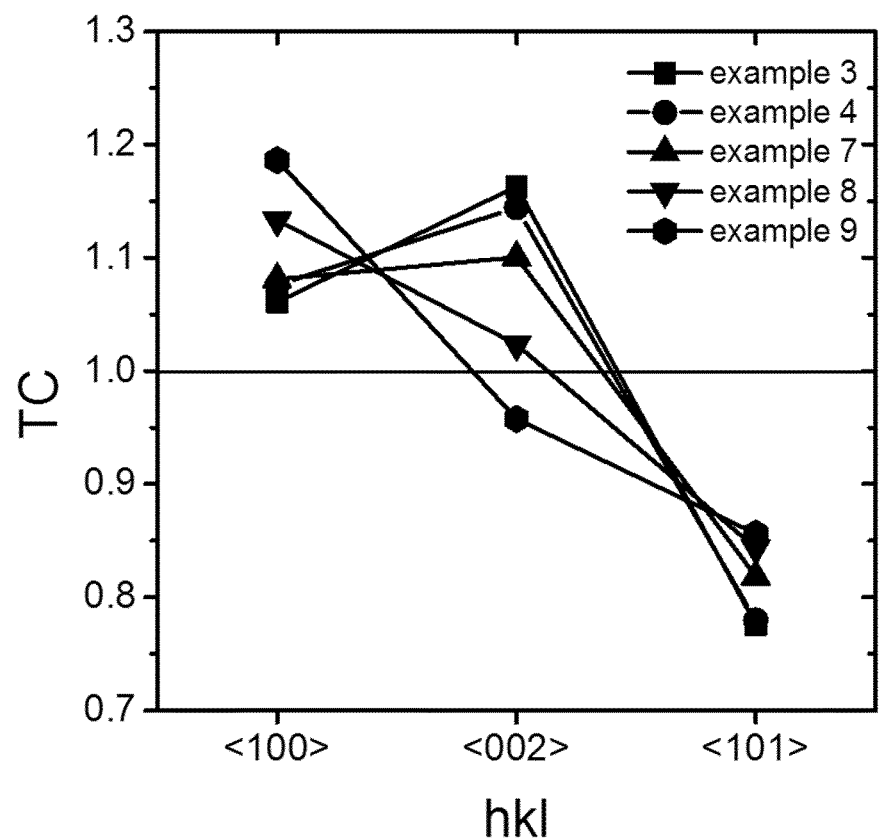

FIG. 9: Graphical representation of the texture coefficients TC for three lattice planes of ZnO derived by analysis of XRD spectra for various examples of primary coated composites.

FIG. 10a): SEM micrograph of a cross-section of composite material (Example 9) showing individualized particles.

10b): Zn— and oxygen amounts in atom-% for various temperatures of tempering (Examples 5, 7, and 9) determined by EDX in an arrangement as shown in FIG. 10a).

Figure 11:
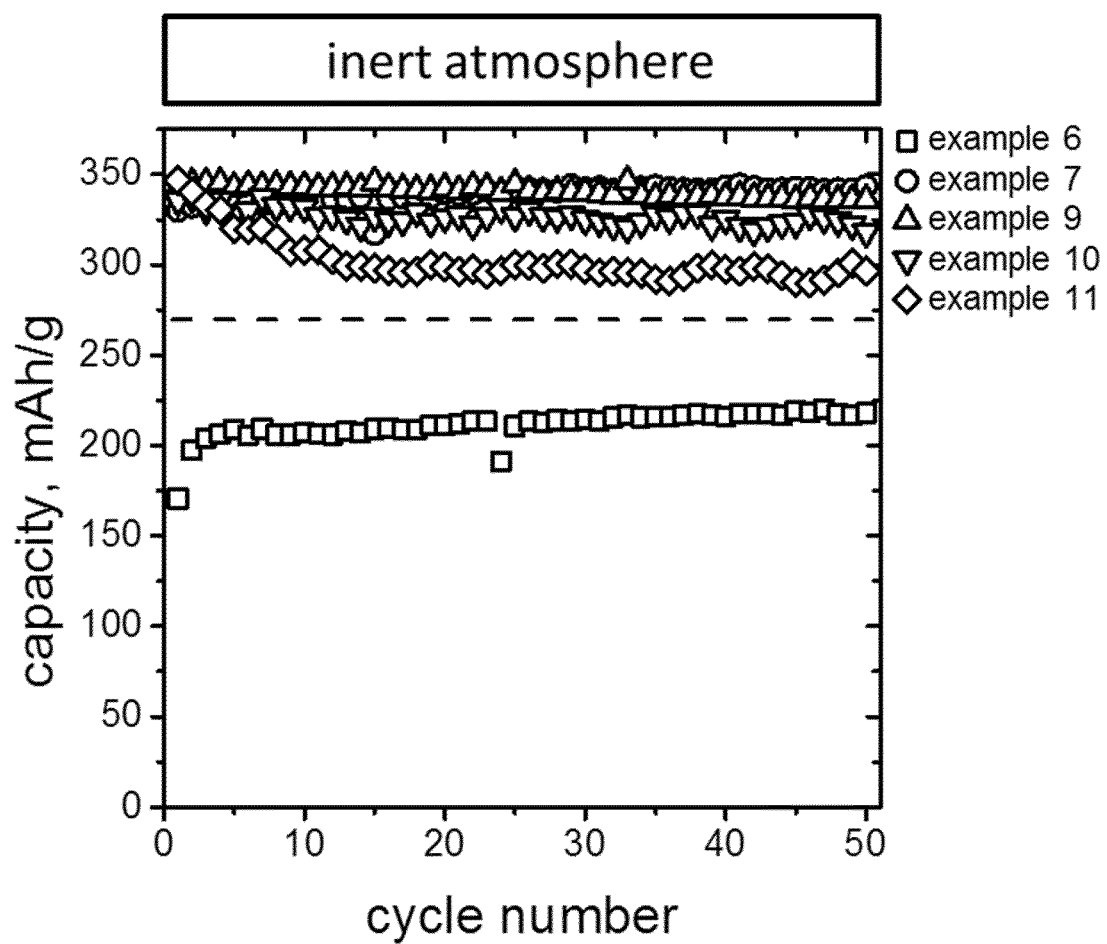

FIG. 11: Capacity vs. number of cycles for exemplified Examples tempered in inert $N_2$ atmosphere. The dashed line represents capacity of uncoated exfoliated graphite.

Figure 12:
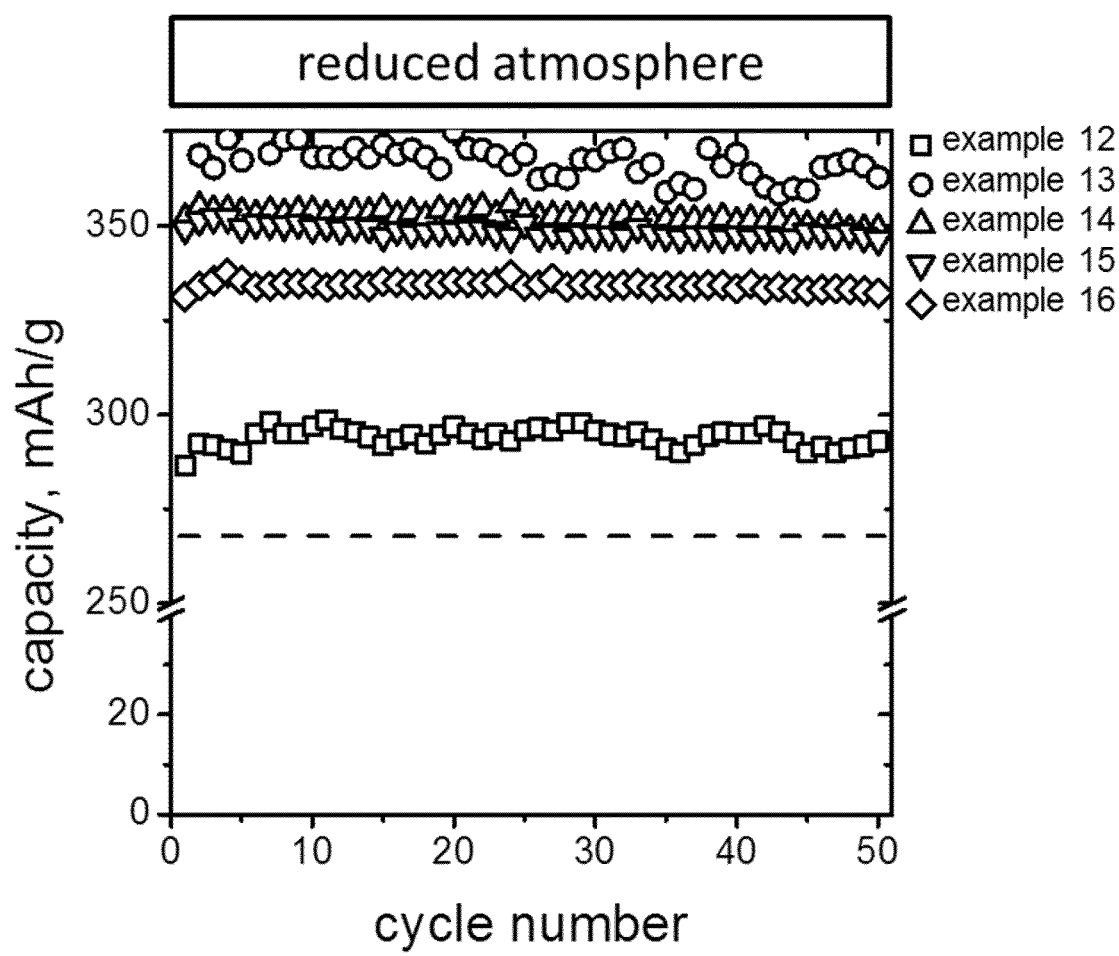

FIG. 12: Capacity vs. number of cycles for exemplified Examples tempered in $H_2/N_2$ atmosphere. The dashed line represents the capacity of uncoated exfoliated graphite.

Figure 13:
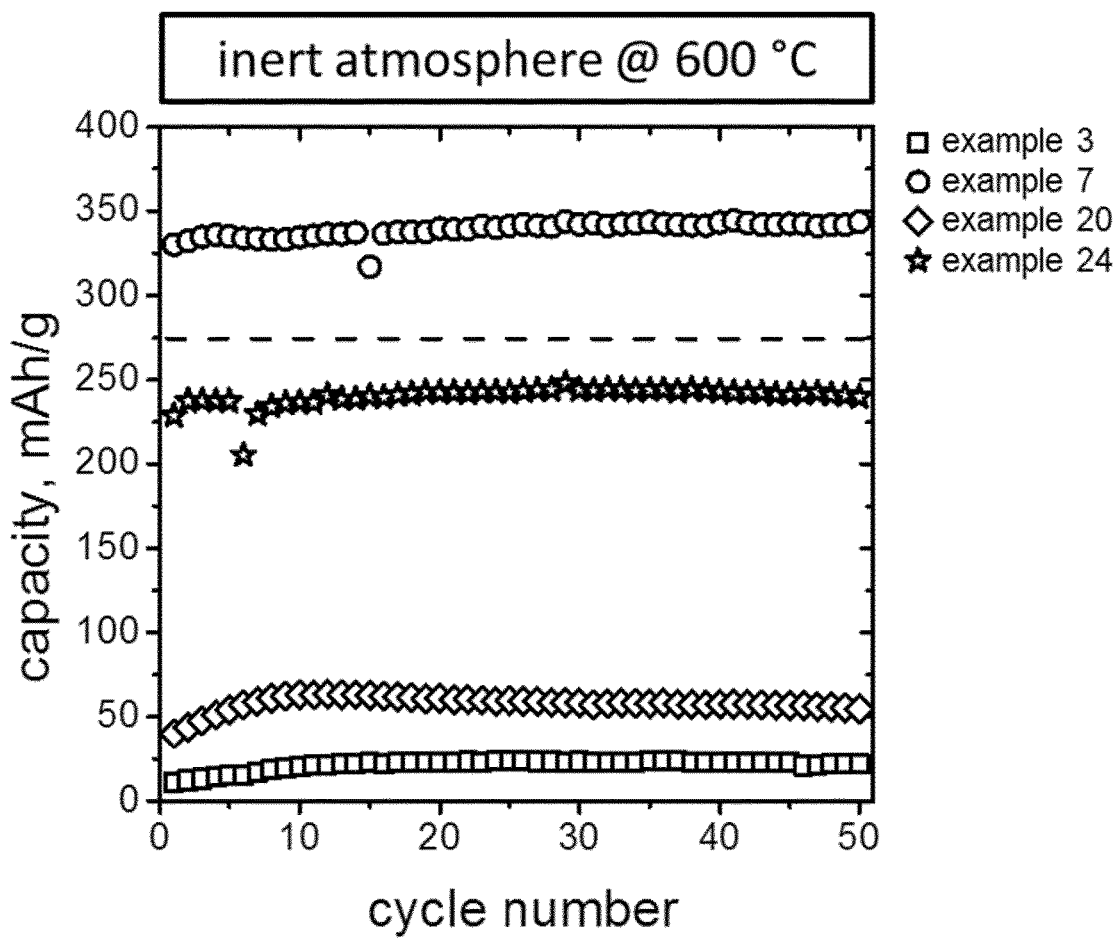

FIG. 13: Capacity vs. number of cycles for Examples tempered in inert $N_2$ atmosphere representing particles a), b), c) and d). The dashed line represents the capacity of uncoated exfoliated graphite.

Figure 14:
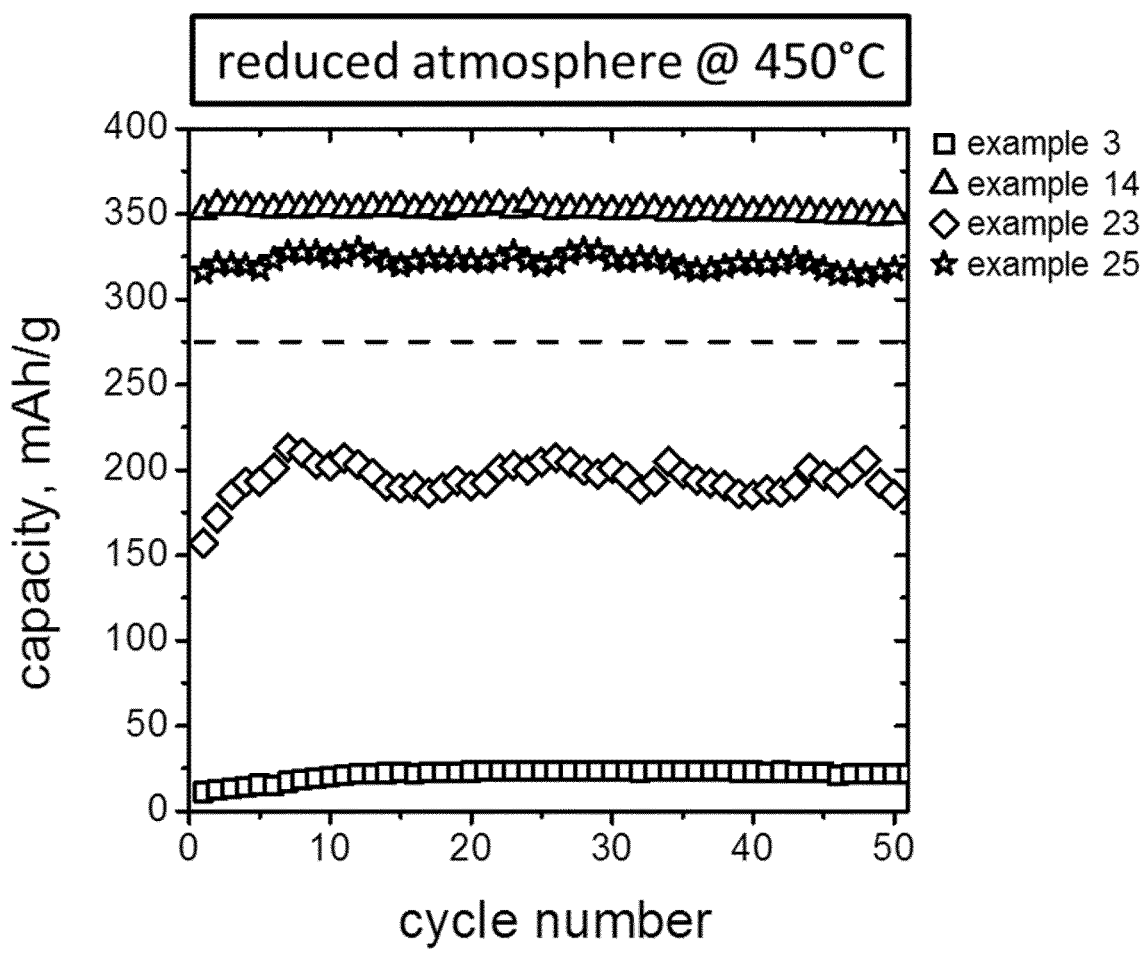

FIG. 14: Capacity vs. number of cycles for Examples tempered in $H_2/N_2$ atmosphere representing particles a), b), c) and d). The dashed line represents the capacity of uncoated exfoliated graphite.

Figure 15:
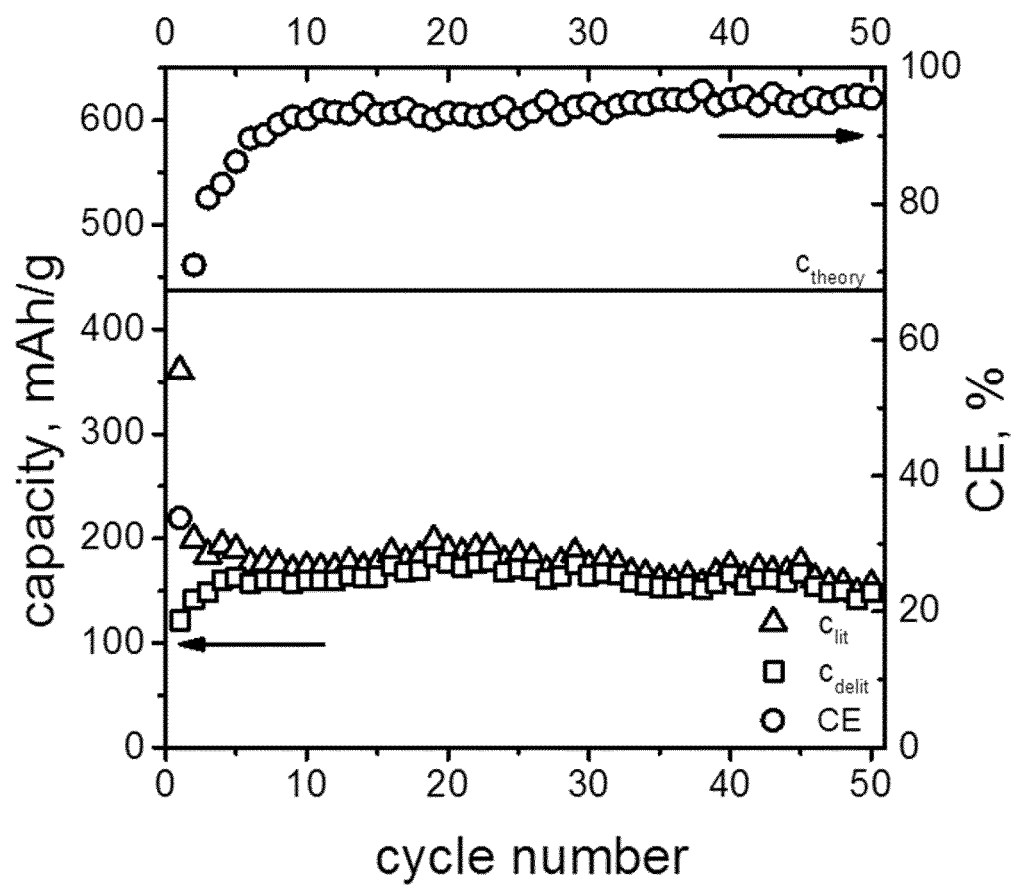

FIG. 15: Capacity and Coulombic efficiency vs. number of cycles for Comparative Example 8 representing a simple mixture of exfoliated graphite and commercially available ZnO nanoparticles with average diameter of 60-100 nm. The solid line represents the theoretical capacity calculated from the theoretical capacity of graphite and ZnO taking into account the weight of each component.

Figure 16:
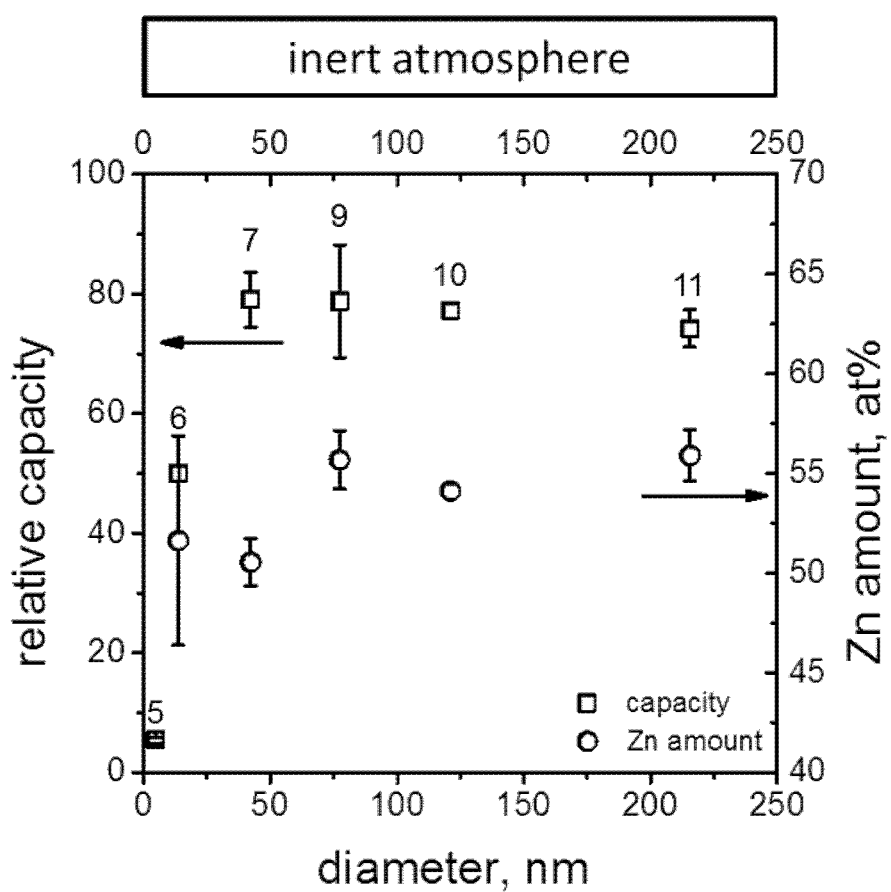

FIG. 16: Specific capacity and amount of Zn as determined by EDX vs. average diameter of ZnO nanoparticles for various Examples (see numbers) tempered in inert $N_2$ atmosphere. The specific capacity here is the percentage capacity of the measured specific capacity with respect to the theoretical specific capacity to eliminate the influence of ZnO coverage.

Figure 17:
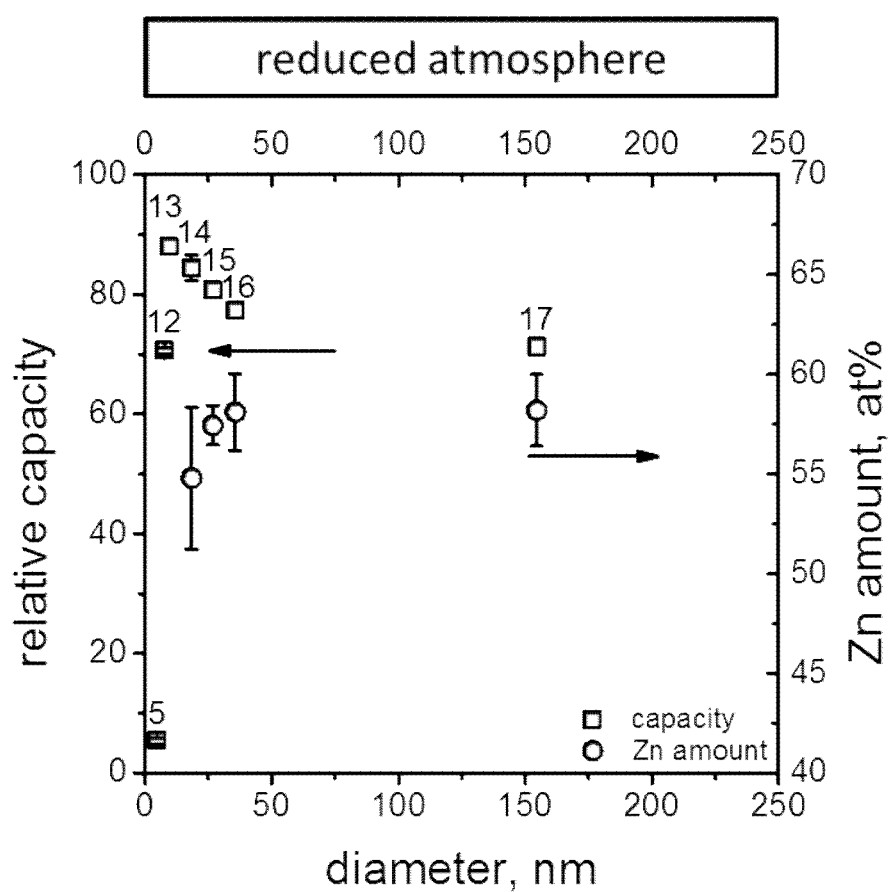

FIG. 17: Specific capacity and amount of Zn as determined by EDX vs. average diameter of ZnO nanoparticles for various Examples (see numbers) tempered in in $H_2/N_2$ atmosphere. The specific capacity here is the percentage capacity of the measured capacity with respect to the theoretical specific capacity to eliminate the influence of ZnO coverage.

Figure 18:
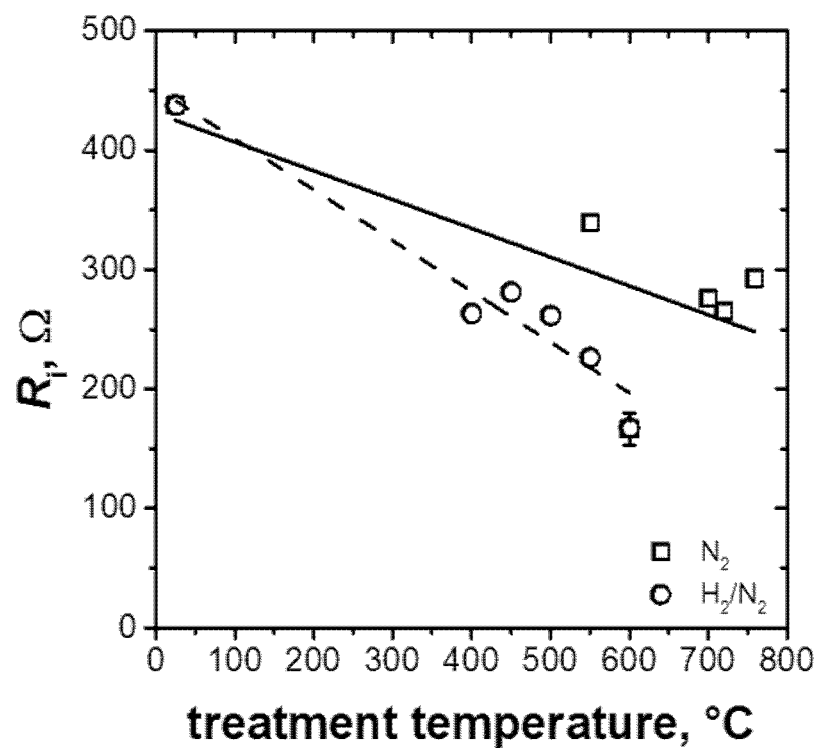

FIG. 18: Ohmic resistance Ri derived from impedance spectroscopic measurements (EIS) vs. treatment temperature for various Examples of composite type b).

COMPOSITES ZNO@EG

The invention is based on a composite comprising an exfoliated graphite support material having a degree of graphitization g of 50 to 93%, obtained by XRD Rietveld analysis, which is coated with ZnO nanoparticles. Preferably the degree of graphitization g is in a range of 65-92.5% and more preferably in a range of 75-92%.

The degree of graphitization g was calculated using the interlayer spacing between single graphene sheets ($d_{002}$) of the exfoliated graphite using the well-known formula:

$$g = \frac{d_{ng} - d_{002}}{d_{ng} - d_g} \quad \text{(IV)}$$

Herein $d_{002}$ is the distance of the lattice planes determined of the measured position of the (002) reflex and calculated according to the Bragg equation, $d_g=335.4$ pm which is a literature value for totally graphitized carbon and $d_{ng}$ represents non-graphitized carbon with a value of 344 pm (V. A: Davydov, A. V: Rakhmanina, V. Agafonov, B. Narymbetov, J. P. Boudou, H. Szwarc, Conversion of polycyclic aromatic hydrocarbons to graphite and diamond at high pressures, *Carbon* 2004, 42(2), 261-269). The Rietveld analysis is used herein to evaluate the g-value.

The range of g of the inventive composites already clearly indicate that the support material is not a carbonaqueous material which could be called to be a "graphene". It is rather a range of values typical for exfoliated graphite. A graphene material would have g-values of below 50%, and even below 30% or 10%.

The composite of this invention has a support material which is still graphitic in it's characteristic. The XRD spectrum of the composite typically exhibits a peak at 2θ=26.4° to 26.5° which is usually attributed to the [002] lattice of the exfoliated graphite. Typically this peak has the maximum intensity of the whole diffractogramm.

Formula (IV) is applicable only to graphitic materials with a $d_{002}$ in a range of 336.01 to 337.95 pm. The (002) lattice plane is the dominant lattice plane of graphite. More preferably $d_{002}$ is in a range of 335.01 to 338.0 pm.

It should be noted that chemical exfoliated graphene oxide sheets reveal a characteristic diffraction peak at 2θ=12.2°. Preferably the XRD spectrum of the composite has essentially no peaks at 2θ=12.2° which would be attributable to oxidized graphene. More preferably such a peak is completely absent in the XRD spectra of the exfoliated support material of this invention. Graphene can be oxidized for example according to Hummer's method. Such oxidized graphene has an enlarged interlayer spacing of about 0.74 nm. Formula (IV) cannot applied to this case as a negative g-value would physically make no sense. Therefore, preferably the exfoliated graphite material is a non-oxidized graphite.

The exfoliated graphite support material is easily accessible from graphite by preferably the impact of ultrasound as will be describe below.

In Li-ion battery anodes the presently used graphite has a rather compact, "potato-like" geometries. In this invention different types of graphites can be used. Preferably graphites are used which can be well exfoliated by the impact of ultrasound. These graphites include platelet-like structures or intermediate structures between potato-like and platelet-like structures or mixtures of these two structures or porous graphites.

The exfoliated graphitic material used as support material for the composites is essentially based on graphite and is therefore easy accessible in large industrial scales. In contrast graphene materials, which have attended a high focus in scientific literature as alternative support materials in Li-ion batteries are still not accessible in high amounts needed for industrial scale-up. Moreover, the oxidation of graphene material as described e.g. by Hummer's method needs to use oxidation chemicals which are not environmentally friendly to use.

It is preferable to have a certain amount of ZnO nanoparticles adsorbed on the surface.

The specific content $c_{sp,ZnO}$ of the ZnO nanoparticles, is determined from the formula:

$$c_{sp,ZnO} = m_{ZnO}/\beta_{gr} \quad (V)$$

wherein $m_{ZnO}$ is the content of ZnO in wt.-%, based on the mass of the total composite as determined from ICP-OES and is the specific surface determined by BET of the exfoliated graphite support material.

The specific content $c_{sp,ZnO}$ is in a range of 0.2 to 0.85 wt-% g/m² and preferably in a range of 0.25 to 0.8 wt-% g/m², more preferably in a range of 0.3 to 0.7 wt-% g/m² and most preferred is a range of 0.3 to 0.65 wt-% g/m².

Below 0.2 wt-% g/m² the coverage is too low to have noticeable effects on the electrochemical properties of the composites. The highest amount of 0.8 wt-% g/m² is difficult to overcome as the inventive composites form essentially a monolayer of nanoparticles of ZnO on the surface of the exfoliated graphite.

In the inventive compositions the exfoliated graphite forms the support and the ZnO nanoparticles are coated on this support. In preferred embodiments the composite has a content of exfoliated graphite and ZnO in an range from 85 to 100 wt.-%, based on the sum of total composite. It is not necessary to add other materials like a binder material or additives to the composite of this invention in significant amounts or at all. Furthermore, the composites of this invention are characterized in that not any of the two basic components exfoliated graphite or ZnO nanoparticles of the composite are formed on any further support material. In further preferred embodiments composite has a content of exfoliated graphite and ZnO in an range from 90 to 99.5 wt.-%, and most preferred of 95 to 99 wt.-%, based on the sum of total composite.

The composites can be easily handled as powders or may be formed into pastes if desired. The absence of any further support material facilitates the processing in e.g. lithium battery anodes.

In this invention four basic composites can be distinguished. These composites consist of:
a) primary composites, wherein the primary composite is produced by a first coating step of the exfoliated graphite support with ZnO nanoparticles or
b) primary tempered composites, which are obtained by tempering the primary composites a) in an inert or a reducing gas atmosphere at a temperature of 350 to 750° C. or
c) secondary composites, obtained by further coating of the primary tempered composites b) with ZnO nanoparticles or
d) secondary tempered composites, which are obtained by tempering the secondary composites c) in an inert or a reducing atmosphere at a temperature of 350 to 750° C.

The most preferred composites are:
a) primary composites, wherein the primary composite is produced by a first coating step of the exfoliated graphite support with ZnO nanoparticles or
b) primary tempered composites, which are obtained by tempering the primary composites a) in an inert or a reducing atmosphere. When tempering is done in an inert atmosphere the temperature of tempering is preferably in a range of 420° C. to 750° C. and more preferable in a range of 550 to 730° C. Below 420° C. the ZnO nanoparticles are not sufficiently activated. Above 730° C. a significant loss of the coverage of ZnO particles are observed.

When tempering is done in a reducing atmosphere the temperature of tempering is preferably in a range of 375° C. to 700° C. In further embodiments the primary coated composites of type b) are tempered in reducing atmosphere in a temperature range of 375 to 550° C. and more preferable in a range of 400 to 550° C. Further preferred ranges are 375-550° C., more preferred 385-500° C. and most preferred 390-450° C.

Below 375° C. the particles are too small and have a too high oxygen content. Above 550° C. the particles become too large and a loss of ZnO particle coverage is recognizable leading to a decrease in the specific capacity.

The composites b) seem to have the most promising electrochemical properties with respect to capacity and cycling stability. Composites of type a) are used as precursor materials when fabricating composites b).

The most preferred embodiments are composites of type b) where the tempering step is made in a reducing atmosphere.

As well known in the art the particle size distribution can be determined by TEM by counting at least 70, preferably at least 100 particles.

Regarding the primary composites a) the ZnO nanoparticles are small nanoparticles of essentially monodisperse particle size distribution. The average particle diameter size $d_{1,ZnO}$ can be determined by TEM and is preferably in a range from 3.0 to 7.0 nm and more preferable in a range from 4.0 to 6.0 nm. The relative standard deviation of the diameters (standard deviation of $d_{1,ZnO}$/average diameter $d_{1,ZnO}$) is below 20%.

The morphology of these particles is rather spherical. The exfoliated graphite is coated on both sides of exfoliated graphite sheets.

The spherical ZnO nanoparticles are homogeneously distributed on the EG sheets without any obvious aggregation, indicated by the presence of a monolayer. The surface coverage ($\theta$) for each domain can be quantitatively evaluated according to the following equation (VI), where $N_s$ is the mean number of adsorbed particles (per unit area) and $r_{pr}$ is the radius of adsorbed primary particles.

$$\theta_{pr} = N_s \pi r_{pr}^2 \quad (VI)$$

Therefore, it is necessary to determine the mean number of adsorbed nanoparticles within the investigated surface area. At low surface coverage the particles adsorb randomly, this makes it impossible to extract useful data from TEM images. Therefore, a new equation for determination of surface coverage is presented, which satisfies the requirements given by the present composite. The main idea here is to calculate the surface coverage within the whole sample in comparison to above the mentioned equation limited by investigated area. Here, the surface coverage can be determined according to the following equation (VII):

$$\theta_{pr} = \frac{3}{2} \times \frac{c}{1-c} \times \frac{1}{\rho_{ZnO} r_{pr} \beta_{EG}} \quad \text{(VII)}$$

Herein $c_{ZnO}$ is the mass quotient of the mass of ZnO to the sum of the masses of ZnO and exfoliated graphite, $r_{pr}$ is the mean radius of the ZnO primary particles as determined by TEM, $\rho_{ZnO}$ is the density of the ZnO nanoparticles and $\beta_{EG}$ is the specific surface (BET) of the support material which is exfoliated graphite. Based on this equation, the surface coverage for each domain can be quantitatively evaluated.

For primary composites a) $\theta_p$, is preferably in a range of 21 to 54% and more preferably in a range of 28-53% and most preferred in an range of 35-52%.

As will be shown in detail in the experimental section the primary particles a) adsorb in a rather random manner on the surface of the exfoliated graphite. For such kind of adsorption 54% are the jamming limit for complete monolayer coverage.

Below 21% the coverage of ZnO nanoparticles on the exfoliated graphite is too low to achieve significant improvement of the electrochemical behavior, even when tempered in a second step. A typical adsorption isotherm is shown in FIG. 5.

The primary coated tempered composite b) grows in its size due to the tempering step by Ostwald ripening. The primary coated tempered composite b) which was tempered in an inert atmosphere preferably exhibits an average particle diameter size $d_{1,ZnO}$ as determined by TEM in a range from 10 to 100 nm and more preferably in a range from 20 to 90 nm and most preferably in a range from 30 to 80 nm.

The average size and also the width of the particle size distribution depends strongly on the temperature of tempering and also under the conditions of the atmosphere as will be shown in the experimental section.

The primary coated tempered composite b) which was tempered in a reducing atmosphere preferably exhibits an average particle diameter size $d_{1,ZnO}$ as determined by TEM in a range from 7 to 150 nm, more preferably in a range from 7 to 50 nm and most preferably in a range from 8 to 40 nm. In further preferred embodiments the average particle diameter size $d_{1,ZnO}$ as determined by TEM in a range from 8 to 30 nm.

These rather small sizes of the ZnO nanoparticles can combine a better electrochemical performance due to a reduction of Zn as well as the large specific surface inherent of such small nanoparticles which are known to lead to diffusion optimized behavior as the Li$^+$-ions have good access to the large ZnO surface.

The relative standard deviation of the diameter (standard deviation of $d_{1,ZnO}$/average diameter $d_{1,ZnO}$) of these particles of type b) are preferably in a range of 30 to 50% and more preferably in a range of 32 to 45%.

As the particle sizes of the tempered primary coated composite b) substantially increases the coverage according to equation (VII) likewise decreases. Many sites of the exfoliated graphene support become free again after the tempering step.

For tempered primary coated composite b) $\theta_{pr}$ is preferably in a range of 2.5 to 38% for and more preferably in a range of 4-30%.

The absolute content of the ZnO nanoparticles for the primary coated composites a) and b) is preferably in a range from 3 to 15 wt.-% and more preferably in a range from 8 to 14 wt.-%, based on the total weight of the composite. Below 3% the coverage will be too low to achieve beneficial effects for the electrochemical behavior and above about 15 wt.-% more than a monolayer may be needed. However, the absolute amounts of ZnO do depend of the specific surface of the supporting exfoliated graphite and therefore these amounts may vary with different graphite materials.

As 15 wt.-% is not an amount which is extremely large it is expected that volume expansion of the composite material when used as anode in a lithium-ion battery is rather low.

Preferably the primarily coated composite a) or the primarily tempered composite b) has a specific content $c_{sp,ZnO}$ of the ZnO nanoparticles, determined from the formula (V) in a range of 0.2 to 0.45 wt-% g/m$^2$ and more preferably in a range of 0.5 to 0.44 g/m$^2$ and most preferably in a range of 0.3 to 0.43 g/m$^2$.

These composites do not exceed a specific content $c_{sp,ZnO}$ of 0.45 g/m$^2$ as monolayers of ZnO nanoparticles are formed for composite of type a) and the amount of ZnO does not increase when producing composite b). Below a specific content $c_{sp,ZnO}$ of 0.2 g/m$^2$ the amount of ZnO may be too low to achieve significant electrochemical improvement.

The ZnO nanoparticles of the tempered primary coated composites b) disappear at 800° C. almost completely probably by sublimation of zinc (see experimental section).

The disappearance of the ZnO nanoparticles at this temperature was attributed to carbothermic reductions:

$$\text{ZnO} + \text{C} \rightarrow \text{Zn} + \text{CO} \quad \text{(VIII)}$$

$$\text{ZnO} + \text{CO} \rightarrow \text{Zn} + \text{CO}_2 \quad \text{(IX)}$$

Reaction (IX) already starts at about 300° C. The reaction rate increases with increasing temperature and finally lead to the disappearance of the ZnO particles at around 800° C. The elemental Zn nanoparticles are supposed to be sublimated at 800° C. The exact concentrations from CO and CO$_2$ are further influenced by the well-known Bouduard equilibrium. Due to the presence of this carbothermic reaction the ZnO nanoparticles can be reduced even in inert gas atmosphere due to the presence of the carbothermic reactions. When tempering in reducing atmosphere the formation of Zn by reduction of ZnO is even more forced due to direct reduction of ZnO from the gas phase.

Domains enriched with elemental zinc in the ZnO crystalline nanoparticles are formed and without being bound to a theory it is assumed that this formation leads to a better electrochemical behavior.

The conversion reaction (II) mentioned in the introduction yields Li$_2$O which is known from literature to form a matrix and which is a quite irreversible reaction. This oxide is known to be electrochemically quite inactive. The formation of elemental Zn domains on the other side enhance the alloying reaction (II) which is quite reversible. Furthermore, the formation of Zn domains in the ZnO crystalline nanoparticles are supposed to enhance the electrical conductivity of the composite material.

The formation of such elemental Zn domains is even more pronounced when tempering is done in a reducing atmosphere. Here reduction processes start at lower temperatures.

In preferred embodiments the composite is a primarily tempered composite b) and has a Zn-content of 52 to 58 atom-% as determined with EDX on cross sections of the composite and measured on single ZnO particles and referenced to Zn— and oxygen content only. The method of determining the content of ZnO and oxygen is further described in chapter B5 in the experimental section.

From the intensities of the XRD reflexes the ZnO signals could be further analyzed with respect to the texture coefficient TC(hkl). This coefficient is reflecting the distribution of the crystallographic orientation of the ZnO nanoparticles in the composites.

The "texture coefficient" TC for a lattice plane <hkl> can be calculated from the intensities $I_0$(hkl) (obtained by a data base) and the measured XRD intensities I(hkl) by equation (X) using Rietveld analysis:

$$TC(hkl) = \frac{\frac{I(hkl)}{I_0(hkl)}}{\frac{1}{i}\Sigma_i \frac{I(hkl)}{I_0(hkl)}} \quad (X)$$

Here i represents the number of the measured peaks. If TC(hkl)≤1 a statistical orientation occurs with respect to the specific (hkl) plane. If TC(hkl)>1 a predominant orientation with respect to the specific (hkl) plane occurs. A complete orientation in the direction of the plane (hkl) would lead to a coefficient TC=i. (L. Spieß, G. Teichert, R. Schwarzer, H. Behnken, C. Genzel, *Moderne Röntgenbeugung*, Vieweg+Teubner, Wiesbaden, 2009).

In FIG. 9 exemplary TC's are shown for a primary coated composite of type a) (example 3, herein labeled as Ref) and also for the primary tempered composites of type b) (examples 3, 4 and examples 7 to 9, see experimental section).

The primary coated composite of example 3 exhibits a predetermination in the <002> plane, which is the dominant graphite lattice plane.

The primary coated composites a) preferably have TC's according to the ZnO nanoparticles exhibiting TC(100)>0.9, TC(002)>1.1 and TC(100)/TC(002)<1. More preferably the ratio TC(100)/TC(002) is in a range from 0.6 to 0.96 and most preferred in a range from 0.65 to 0.95.

This can be attributed to an epitaxial growth of the nanoparticles on the surface of the exfoliated graphite.

For the primary coated composites b) a significant change with increasing temperature of the preorientation to the <001> direction can be seen. Therefore the TC(100) increases and preferably TC(100)>1, TC(002)>0.9 and the ratio TC(100)/TC(002) is in a range of 0.8 to 1.3. More preferred for the primary coated composites b) is a ratio TC(100)/TC(002) is in a range of 0.9-1.28 and most preferred in a range of 0.95-1.25.

Without being to be bound to a theory it is believed that this change TC-values can be attributed on one hand site the growth of the particles of type a) to type b) by Ostwald ripening and on the other side by the formation of Zn rich domains in the ZnO nanoparticles.

In further embodiments of this invention the primary coated and tempered composites b) can be further coated with ZnO nanoparticles leading to secondary coated composites of type c) and these composites can be again tempered to yield secondary coated and tempered composites of type d). These type of composites naturally have a higher specific content $c_{sp,ZnO}$ of the ZnO nanoparticles as determined from the formula (V). Preferably for composites c) and d) $c_{sp,ZnO}$ is in an range of 0.5 to 0.85, more preferably in a range of 0.55 to 0.75 and most preferable in a range of 0.56 to 0.65.

The ZnO nanoparticles of the secondary coated composites c) have particle size distributions of two different size ranges as the larger particles derived by the first tempering step overlap with the new small nanoparticles which are coated on the free sites of the substrate. Therefore the ZnO nanoparticles of type c) as determined by TEM comprises two distinguishable particle distributions exhibiting two average diameters $d_{1,ZnO}$ and $d_{2,ZnO}$, wherein the average diameters $d_{1,ZnO}$ is preferably in a range from 3 to 7 nm and in the average diameter $d_{2,ZnO}$ is in a range from 7 to 100 nm. In more preferred embodiments the $d_{1,ZnO}$ is in a range of 4.0 to 6.0 nm and $d_{2,ZnO}$ is in a range of 20 to 80 nm and more preferred in a range of 30 to 70 nm.

Therefore, the coverage according to equation (VII) cannot be applied to these types of composites, as this formula is operating only with one diameter (or radius).

The TC's for the secondary coated particles c) derived from the intensities of the XRD reflexes according to the ZnO nanoparticles exhibit preferably TC(100)>1, TC(002)>0.95 and TC(100)/TC(002) is in an range of 0.95-1.2.

The composites of type c) have to be proved to be, like composites a), rather inactive in their electrochemical behavior. They are, however, the precursor materials of composites of type d).

Type d) composites are electrochemically more active than exfoliated graphite especially when the tempering step occurred in a reducing atmosphere.

Therefore this type of composite d) is preferred, in that at least one tempering step occurred in reducing atmosphere, more preferably both steps occurred in reducing atmosphere.

The secondary coated composite c) and d) have preferable a total content of the ZnO nanoparticles in an range of 12 to 25 wt.-%, based on the total weight of the composite.

Methods of Producing Composites ZnO@EG

The primary coated composites of type a) can be produced by three different, very simple methods:

Method A: This method is called (syn). It comprises the following consecutive steps:
i) a Zn(II)salt is dissolved in a solvent
ii) graphite and a base are added simultaneously
iii) the mixture is stirred under impact of ultrasound
iv) the solvent is removed from the suspension Method B: This method is called (pre). It comprises the following consecutive steps:
i) graphite is suspended in a solvent and exfoliated via impact of ultrasound
ii) a Zn(II)salt and a base are added simultaneously forming nano-ZnO particles
iii) the mixture is stirred
iv) the solvent is removed from the suspension Method C: This method is called (post). It comprises the following steps:
i) a Zn(II)salt and a base are mixed in a solvent in a first reactor forming nano-ZnO particles
ii) graphite is exfoliated via impact of ultrasound in a second reactor
iii) both suspensions of i) and ii) are mixed together
iv) after step iii) the solvent is removed from the suspension.

In all the methods the formation of ZnO nanoparticles is based on the optimized method of Bahnemann (D. W. Bahnemann, C. Kormann, M. R. Hoffmann, Preparation and Characterization of Quantum Size Zinc-Oxide—A detailed Spectroscopic Study, *J. Phys. Chem.* 1987, 9/(14), p. 3789-3798) and Meulenkamp (E. A: Meulenkamp, Synthesis and growth of ZnO nanoparticles, *J. Phys. Chem. B* 1998, 102(29), p. 5566-5572).

For all the methods of producing a composite of type a) the solvent is selected from the group consisting of ethanol, isopropanol, n-butanol, n-pentanol, n-hexanol or mixtures thereof. Especially preferred is isopropanol. or ethanol.

For all the methods of producing a composite of type a) the temperature is preferably in a range of 10 to 35° C. and preferred in an range of 16 to 25° C. or simply room temperature.

For all the methods of producing a composite of type a) the Zn(II) salt is preferably selected from the group consisting of Zn(acetate)$_2$, ZnCl$_2$, ZnSO$_4$ or mixtures thereof. Especially preferred is Zn(acetate)$_2$.

The base is preferably selected from the group consisting of LiOH, NaOH, KOH, NH$_4$OH or mixtures thereof. Especially preferred is LiOH.

The impact of ultrasound is needed to exfoliate the graphite support material. The times of ultrasound impact and the intensities may vary according to the behavior of the particular graphite material and to the desired degree of exfoliation.

The removal of the solvent from the composites can be done by any conventional means such as filtering or centrifuging.

A method of producing the primary tempered composite b) comprises a tempering step of a primary coated composite of type a) produced by any of the methods A), B) or C) at a temperature in a range of 420° C. to 750° C. in either an inert atmosphere or at a temperature in a range of 375° C. to 700° C. in a reducing atmosphere.

More preferred are composites tempered in an inert atmosphere where the temperature of tempering is in a range of 550 to 730° C. and for composites tempered in a reducing atmosphere the temperature of tempering is preferably in a range of 375 to 550° C., more preferably in a range of 400 to 550° C. Further preferred ranges are 375-550° C., more preferred 385-500° C. and most preferred 390-450° C.:

Below 375° C. the particles are too small and have a too high oxygen content. Above 550° C. the particles become too large and a loss of ZnO particle coverage is recognizable leading to a decrease in the specific capacity.

Within these temperature ranges the optimized particle sizes and probably also the formation of Zn rich zones in the ZnO particles are accessible.

The time for this tempering step should be preferably in the range of 0.5 to 2.5 hours at the desired temperature maximum. A temperature ramp may be used to heat the samples up from room temperature to the final tempering temperature.

An inert atmosphere is preferably a N$_2$ or an Argon atmosphere or a mixture of these gases.

When tempering in a reduced atmosphere the reducing atmosphere consists essentially of a mixture of inert and reducing gases like preferably N$_2$/H$_2$ or Ar/H$_2$ mixtures or mixtures thereof.

Here these gases may be mixed in a v/v-% ratio of 90:10 or 95:5.

Hydrogen is a preferred reducing agent as it does not produce any toxic by-products.

The composite may be moved slightly by conventional means during the tempering step to ensure a homogeneous temperature distribution within the sample avoiding local overheating. When tempering in a reducing atmosphere a homogenous mixing with hydrogen may also be facilitated.

It is preferred to do the tempering step in a reducing atmosphere.

When producing the secondary composite c) a primary coated and tempered composite b) is used as the substrate instead of exfoliated graphite by applying any of the methods A), B) or C). More preferred are the methods B) (pre) or the C) (post) and most preferred is method C) (post).

Composites d) are produced by tempering the secondary coated composite c) by essentially the same method as described above for producing composite b). It is possible to combine different atmospheres in the two tempering steps in any of the four possible manners.

Here again reducing atmospheres are applicable and are preferred. Most preferred is applying a reducing atmosphere by each of the two tempering steps.

Another embodiment of the present invention concerns the use of the composites of type a), b), c) or d) in an anode of a lithium-ion battery, as n-conductor in a solar cell, as a photo catalyst material or in a super capacity device.

It is believed that composite a) which can be produced by simple methods is usable directly in some or many of these application fields. Definitely composite a) is at least usable as an intermediate product for other composite materials usable in these applications. Especially preferred is the use of composite a) as intermediate product for production of the primary coated tempered composite b).

Especially preferred is the use of the primary tempered composites b) in an anode of a lithium-ion battery. Furthermore preferred is the use of secondary tempered composite d) which is preferably made with at least one tempering step, preferably both tempering steps in a reduced atmosphere.

A further embodiment is an anode usable in a lithium-ion battery comprising the composites a), b), c) or d) and especially preferred is anode usable in a lithium-ion battery comprising the primary coated tempered composites b). A further preferred embodiment is an anode usable in a lithium-ion battery comprising the composite d) which is preferably made with at least one tempering step, preferably both tempering steps in a reduced atmosphere.

A further embodiment is a lithium-ion battery comprising the anode comprising the composites a), b), c) or d) and especially preferred is a lithium-ion battery comprising the anode usable in a lithium-ion battery comprising the primary coated tempered composites b). A further preferred embodiment is a lithium-ion battery comprising the anode comprising the composite d) which is preferably made with at least one tempering step, preferably both tempering steps in a reduced atmosphere.

These lithium-ion batteries may be used in any of the applications like for example in electrical cars or in lap-tops.

The invention further contains the following aspects:

According to an aspect 1 the inventive composite comprises an exfoliated graphite support material having a degree of graphitization g of 50 to 93%, obtained by XRD Rietveld analysis, wherein g is determined by the formula (IV):

$$g = \frac{d_{ng} - d_{002}}{d_{ng} - d_g} \tag{IV}$$

wherein $d_{002}$ is the distance of the lattice planes determined of the measured position of the (002) reflex and calculated according to the Bragg equation, $d_g$=335.4 pm which is a literature value for totally graphitized carbon and $d_{ng}$ represents non-graphitized carbon with a value of 344 pm, wherein said exfoliated graphite support material is coated with ZnO nanoparticles.

According to an aspect 2 the composite according to aspect 1 has a content of exfoliated graphite and ZnO from 85 to 100 wt.-%, based on total weight of the composite.

According to an aspect 3 the composite according to any of aspect 1 or aspect 2, wherein the specific content $c_{sp,ZnO}$ of the ZnO nanoparticles, determined from the formula (V):

$$c_{sp,ZnO} = m_{ZnO}/\beta_{gr} \qquad (V)$$

wherein $m_{ZnO}$ is the content of ZnO in wt.-%, based on the mass of the total composite as determined from ICP-OES and $\beta_{gr}$ is the specific surface determined by BET of the exfoliated graphite support material, is in a range of 0.2 to 0.85 wt-% g/m².

According to an aspect 4 the composite according to any of the previous aspects 1 to 3, wherein the exfoliated graphite material is a non-oxidized graphite.

According to an aspect 5 the composite according to any of the previous aspects 1 to 4, wherein the XRD spectrum of the composite exhibits a maximum peak at 2θ=26.4° to 26.5° attributed to the [002] lattice of the exfoliated graphite.

According to an aspect 6 the composite according to any of the previous aspects 1 to 5, wherein the XRD spectrum of the composite has essentially no peaks at 2θ=12.2° which would be attributable to oxidized graphene.

According to an aspect 7 the composite according to any of the previous aspects, wherein the exfoliated graphite support exhibits a distance $d_{002}$ between the planar graphene units in the (002) lattice plane, as determined by XRD in a range of 336.01 to 337.95 pm., preferably in a range of 335.01 to 338.0 pm.

According to an aspect 8 the composite according to any of the previous aspects, wherein any of the two basic components exfoliated graphite or ZnO nanoparticles of the composite are not formed on a further support material.

According to an aspect 9 the composite according to any of the previous aspects, wherein the composites consist of
a) primary composites, wherein the primary composite is produced by a first coating step of the exfoliated graphite support with ZnO nanoparticles or
b) primary tempered composites, which are obtained by tempering the primary composites a) in an inert or a reducing gas atmosphere at a temperature of 350 to 750° C. or
c) secondary composites, obtained by further coating of the primary tempered composites b) with ZnO nanoparticles or
d) secondary tempered composites, which are obtained by tempering the primary composites c) in an inert or a reducing atmosphere at a temperature of 350 to 750° C.

According to an aspect 10 the composite according to aspect 9, wherein the composites consist of
a) primary composites, wherein the primary composite is produced by a first coating step of the exfoliated graphite support with ZnO nanoparticles or b) primary tempered composites, which are obtained by tempering the primary composites a) in an inert or a reducing atmosphere, wherein the temperature of tempered is in a range of 420° C. to 750° C. when using an inert atmosphere or in a range of 375° C. to 700° C. when using a reducing atmosphere.

According to an aspect 11 the composite according to any of the aspects 9 or 10, wherein at least one tempering step is made in a reducing atmosphere.

According to an aspect 12 the composite according to aspect 9 or 10, wherein the average particle size $d_{1,ZnO}$ of the ZnO nanoparticles in the primary coated composite a) is in a range from 3.0 to 7.0 nm as determined by TEM.

According to an aspect 13 the composite according to aspect 12, wherein the average particle size $d_{1,ZnO}$ of the ZnO nanoparticles in the primary coated composite a) is in a range from 4.0 to 6.0 nm.

According to an aspect 14 the composite according to aspect 9 to 13, wherein the composite is a primary composite a) or a primary tempered composite b) and the ZnO nanoparticles have a coverage $\theta_{pr}$ of the ZnO nanoparticles, determined from the formula (VII):

$$\theta_{pr} = \frac{3}{2} \times \frac{c}{1-c} \times \frac{1}{\rho_{ZnO} r_{pr,se} \beta_c} \qquad (VII)$$

wherein c is the mass quotient of the mass of ZnO to the sum of the masses of ZnO and exfoliated graphite, $r_{pr,se}$ is the mean radius of the ZnO primary or secondary particles as determined by TEM, $\rho_{ZnO}$ is the density of the ZnO nanoparticles, $\beta_c$ is the specific surface (BET) of the support material and wherein $\theta_p$, is in a range of 21 to 54% for primary composites a) or $\theta_{pr}$ is in a range of 2.5 to 38% for primary tempered composites b).

According to an aspect 15 the composite according to any of aspects 9 to 14, wherein the composite is a primary coated composite a) and the XRD signals according to Rietveld analysis of the ZnO nanoparticles exhibit TC(100)>0.9, TC(002)>1.1 and TC(100)/TC(002)<1, or the composite is a primary coated tempered composite b) and the XRD signals according to Rietveld analysis of the ZnO nanoparticles exhibit TC(100)>1, TC(002)>0.9 and the ratio TC(100)/TC (002) is in a range of 0.8 to 1.3.

According to an aspect 16 the composite according to any of the aspects 9 to 11 or 14 to 15, wherein the average particle size $d_{1,ZnO}$ of the ZnO nanoparticles in the primary coated tempered composite b) which was tempered in an inert atmosphere is in a range from 10 to 100 nm as determined by TEM.

According to an aspect 17 the composite according to aspect 9 or any of aspects 15 to 16 the composite is a primarily coated composite a) or a primarily tempered composite b) and has a specific content $c_{sp,ZnO}$ of the ZnO nanoparticles, determined from the formula (V):

$$c_{sp,ZnO} = m_{ZnO}/\beta_{gr} \qquad (V)$$

wherein $m_{ZnO}$ is the content of ZnO in wt.-%, based on the mass of the total composite as determined from ICP and is the specific surface determined by BET of the exfoliated graphite support material, is in a range of 0.2 to 0.45 wt-% g/m².

According to an aspect 18 the composite according to aspect 9 or 10 or any of aspects 14 to 17 the composite is a primarily tempered composite b) and has a Zn-content of 52 to 58 atom-% as determined with EDX on cross sections of the composite and measured on single ZnO particles and referenced to Zn— and oxygen content only.

According to an aspect 19 the composite according to aspect 9 or any of aspects 15 to 18 the primary coated tempered composite b) is tempered in reduced atmosphere and the average particle size $d_{1,ZnO}$ of the ZnO nanoparticles is in a range of 7 to 50 nm as determined by TEM.

According to an aspect 20 the composite according to aspect 19 the primary coated tempered composite b) is tempered in reduced atmosphere and the average particle size $d_{1,ZnO}$ of the ZnO nanoparticles is in a range of 8 to 40 nm.

According to an aspect 21 the composite according to aspect 9, wherein the composite is a secondary coated composite c) or d) and the ZnO nanoparticles have a specific content $c_{sp,ZnO}$ of the ZnO nanoparticles, determined from the formula (V):

$$c_{sp,ZnO} = m_{ZnO}/\beta_{gr}$$

herein $m_{ZnO}$ is the content of ZnO in wt.-% of the composite and $\beta_{pr}$ is the specific surface of the exfoliated graphite substrate and wherein $c_{sp,ZnO}$ is in a range of 0.5 to 0.85 for composites c) and d).

According to an aspect 22 the composite according to aspect 21 wherein the $c_{sp,ZnO}$ is in a range of 0.55 to 0.75.

According to an aspect 23 the composite according to any of aspects 9 or 21 to 22, wherein the XRD signals for composites c) or d) according to Rietveld analysis of the ZnO nanoparticles exhibit for the ZnO nanoparticles TC(100)>1, TC('002)>0.95 and TC(100)/TC('002)=0.95-1.2.

According to an aspect 24 the composite according to any of the aspects 9 or 21 to 23, wherein for secondary coated composite c) the particle size distribution of the ZnO nanoparticles as determined by TEM comprises two distinguishable particle distributions exhibiting two average diameters $d_{1,ZnO}$ and $d_{2,ZnO}$, wherein the average diameters $d_{1,ZnO}$ is in a range from 3 to 7 nm and in the average diameter $d_{2,ZnO}$ is in a range from 7 to 100 nm.

According to an aspect 25 the composite according to any of the previous aspects 9 to 16, wherein the content of the ZnO nanoparticles is from 3 to 15 wt.-% for the primary coated composites a) and b), based on the total weight of the composite %.

According to an aspect 26 the composite according to any of the previous aspects 9 or 21 to 24, wherein the content of the ZnO nanoparticles is from 12 to 25 wt.-% for the secondary coated composite c) and d), based on the total weight of the composite.

According to an aspect 27 the methods of producing a primary coated composite a) according to aspect 9 to 15 are characterized in that
A) (syn) the method comprises the following consecutive steps:
i) a Zn(II)salt is dissolved in a solvent
ii) graphite and a base are added simultaneously
iii) the mixture is stirred under impact of ultrasound
iv) the solvent is removed from the suspension
or
B) (pre) the method comprises the following consecutive steps:
i) graphite is suspended in a solvent and exfoliated via impact of ultrasound
ii) a Zn(II)salt and a base are added simultaneously forming nano-ZnO particles
iii) the mixture is stirred
iv) the solvent is removed from the suspension
or
C) (post) the method comprises the following steps:
i) a Zn(II)salt and a base are mixed in a solvent in a first reactor forming nano-ZnO particles
ii) graphite is exfoliated via impact of ultrasound in a second reactor
iii) both suspensions of i) and ii) are mixed together
iv) after step iii) the solvent is removed from the suspension.

According to an aspect 28 a method of producing a composite of a graphite support which is coated with ZnO nanoparticles according to aspect 27, wherein the solvent is selected from the group consisting of ethanol, isopropanol, n-butanol, n-pentanol, n-hexanol or mixtures thereof.

According to an aspect 29 a method of producing a composite of a graphite support which is coated with ZnO nanoparticles according to aspect 27 or 28, wherein the temperature is in a range of 10 to 35° C.

According to an aspect 30 a method of producing a composite of a graphite support which is coated with ZnO nanoparticles according to any of the aspects 27 to 29, wherein the Zn(II) salt is selected from the group consisting of $Zn(acetate)_2$, $ZnCl_2$, $ZnSO_4$ or mixtures thereof.

According to an aspect 31 a method of producing a composite of a graphite support which is coated with ZnO nanoparticles according to any of the aspects 27 to 30, wherein the base is selected from the group consisting of LiOH, NaOH, KOH, $NH_4OH$ or mixtures thereof.

According to an aspect 32 a method of producing a primary tempered composite b) according to any of aspect 7 to 9 or any of aspect 12 to 14, wherein the primary coated composite a) produced by the methods A), B) or C) of any of the aspects 27 to 31 is tempered at a temperature in a range of 420° C. to 750° C. in an inert atmosphere or is tempered at a temperature in a range of 375° C. to 700° C. in a reducing atmosphere.

According to an aspect 33 a method of producing a primary tempered composite b) according to aspect 32, wherein for composites tempered in an inert atmosphere the temperature of tempering is in a range of 550 to 730° C. and for composites tempered in a reducing atmosphere the temperature of tempering is in a range of 375° C. to 550° C. and more preferably in a range of 400 to 550° C.

According to an aspect 35 a method of producing a primary tempered composite b) according to aspect 32 or 33, wherein the reducing atmosphere consists essentially of a mixture of inert and reducing gases and is taken from the group consisting of $N_2/H_2$ or $Ar/H_2$ mixtures or mixtures thereof.

According to an aspect 35 a method of producing a secondary composite c) of a graphite support which is coated with secondary ZnO nanoparticles according to aspects 9 or 17 to 24, by coating a primary coated and tempered composite b) produced by any of the methods of aspects 32 to 34 according to any of the methods A), B) or C) of any of the aspects 27 to 31, wherein a primary coated and tempered composite b) is used in these methods A), B) or C) instead of graphite.

According to an aspect 36 a method of producing a composite of a graphite support which is coated with ZnO nanoparticles according to aspect 35, wherein the secondary coated composite c) is coated by the B) (pre) or the C) (post) coating method of aspects 27 to 31 in the second ZnO nanoparticle coating step.

According to an aspect 37 a method of producing a secondary tempered composite d) according to any of the aspects 7 or 8 or aspects 21 to 23, wherein the secondary coated composite c) obtained by the method of aspects 35 or 36 is tempered at a temperature in a range of 550 to 700° C. in an inert atmosphere.

According to an aspect 38 a method of producing a secondary tempered composite d) according to aspect 37 wherein the tempering is made in a reducing atmosphere.

According to an aspect 39 a method of producing a secondary tempered composite d) according to aspect 38, wherein the reducing atmosphere consists essentially of a mixture of inert and reducing gases and is taken from the group consisting of $N_2/H_2$ or $Ar/H_2$ mixtures or mixtures thereof.

An aspect 40 is dedicated to the use of the composite of any of aspects 1 to 26 in an anode of a lithium ion battery, as n-conductor in a solar cell, as photo catalyst, or in a super capacity device.

An aspect 41 is dedicated to the use of a composite in an anode of a lithium-ion battery according to aspect 40, wherein the composite is a primary tempered composites b) of any of aspects 9 or 10 or aspects 14 to 20 or of a secondary coated composite d) tempered in reduced atmosphere according to any of the aspects 8, 11, 21, 22 or 26.

An aspect 42 is dedicated to an anode usable in a lithium-ion battery comprising the composite of aspects 1 to 26.

An aspect 43 is dedicated to an anode according to aspect 41 usable in a lithium-ion battery comprising the primary coated tempered composites b) of aspects 9 or 10 or any of aspects 14 to 20 or of a secondary coated composite d) tempered in reduced atmosphere according to any of the aspects 8, 11, 21, 22 or 26.

An aspect 45 is dedicated to a lithium-ion battery comprising the anode of aspect 42 or 43.

An aspect 45 is dedicated to the use of the primary coated composites a) of aspects 9 to 14 as intermediate product for production of the primary coated tempered composite b) of aspects 9 or 10 and aspects 14 to 20.

EXAMPLES

A Synthetization of ZnO Coated Exfoliated Graphite Composites a Initial Graphite (Comparative Example 1)

Generally ECOPHIT G GFG 350 (SGL Carbon) was used as graphite material (Comparative Example 1). It exhibits a high carbon content (purity 95%) and a $D_{50}$-value of 315-385 pm. It's specific surface (BET) was 24.1 $m^2/g$. Before use of the graphite for forming the composite the material was sieved with 400 pm and 200 pm mesh sieves and the middle fraction was used for further experiments.

b Exfoliated Graphite (EG; Comparative Example 2)

4 g of graphite of comparative example 1 was dispersed in 400 ml of isopropanol and subjected to ultrasound impact (Tip-signification from Hielscher, Germany) at 160 W for 90 min.

c Synthesis of ZnO Nanoparticles (in Pure Form: Comparative Example 3)

The ZnO nanoparticles were synthesized always according to the optimized method of Bahnemann (D. W. Bahnemann, C. Kormann, M. R. Hoffmann, Preparation and Characterization of Quantum Size Zinc-Oxide—A detailed Spectroscopic Study, *J. Phys. Chem.* 1987, 91(14), p. 3789-3798) and Meulenkamp (E. A: Meulenkamp, Synthesis and growth of ZnO nanoparticles, *J. Phys. Chem. B* 1998, 102(29), p. 5566-5572):

3.99 g (0.018 moles) $Zn(CH_3COO)_2$—$H_2O$ (Sigma-Aldrich, purity ≥99%) was first dissolved in the 1.46 L boiling isopropanol and was allowed to cool to room temperature. Using ultrasonic bath 1.22 g (0.029 mole) LiOH were dissolved in 365 mL isopropanol. Then the LiOH solution was added to the dissolved $Zn(CH_3COO)_2$—$H_2O$ solution under stirring in a shot. The dispersion turned from transparent to turbid. The turbidity vanished after 30 min and the dispersion was stirred fur further 24 h. The diameter of the resulting ZnO nanoparticles showed a maximum in a UV/VIS spectrum located at 321 nm.

The ZnO nanoparticles synthesized by this method had a mean diameter of 3.7 nm as evaluated by TEM analysis.

A1 Primary Coated Composites a)

Three different methods were used to produce primary coated composites.

Example 1 ZnO@EG (Syn)

4 g graphite were added to a solution of 3.99 g $Zn(CH_3COO)_2$—$H_2O$ dissolved in 1.46 L isopropanol. Subsequently, 1.22 g LiOH dissolved in 365 mL isopropanol was added to the mixture in a shot under vigorous stirring. This mixture was further stirred at room temperature overnight forming a first composite. This composite was sonicated (Tip-sonofication from Hielscher, Germany) at 160 W for 190 min and the allowed to settle for 24 h to yield the primary ZnO@EG composite. The solid composite was separated from solution using a Buchner funnel, washed repetitively with isopropanol and the dried at 50° C. for 3 h in a compartment dryer.

Example 2 ZnO@EG (Pre)

The first step of the composite formation was the exfoliation of the graphite by ultrasound impact. Therefore, 4.0 g graphite were dispersed in 400 mL isopropanol using ultrasonic radiation for 90 min (160 W). Subsequently, 1.46 L isopropanol containing 3.99 g $Zn(CH_3COO)_2$—$H_2O$ was added to the above dispersion. Finally, 1.22 g LiOH dissolved in 365 mL isopropanol was added to the mixture in a shot under vigorous stirring. The mixture was stirred overnight at room temperature. The resulting product was filtered, washed and dried as described in example 1.

Example 3 ZnO@EG (Post)

The two components for the composite formation were prepared separately. The ZnO nanoparticle formation was conducted as described in part c above (comparative example 3). The exfoliated graphite (EG) was prepared as described in comparative example 2. Both components were mixed under vigorous stirring and stirred overnight. The resulting product was filtered, washed and dried as described in example 1.

All the Examples 1 to 3 exhibited an excess of ZnO nanoparticles. This could be easily verified by measuring the UV/Vis spectrum of the washed solutions and recalculating the concentration of excess ZnO nanoparticles which were not adsorbed of the exfoliated graphite substrate by using the extinction at 321 nm and an extension coefficient of 594 $mol^{-1}$ $cm^{-1}$ L. Furthermore the concentrations of ZnO nanoparticles in the solutions was determined using ICP-OES yielding a good match with the concentrations determined by UV/VIS spectroscopy.

Examples 3 a to 3 h (Post, Variation Concentration of Stock Solution)

Example 3 was repeated several times but diluted solutions of ZnO nanoparticles were used. The properties of ZnO nanoparticles stock solution (SL) with ~3.7 nm in diameter were not altered here. The mean diameter of 4.7 nm on the surface of the exfoliated graphite is most likely due to further growth of the ZnO particles by excess zinc salt and base after mixing the exfoliated graphite and the ZnO nanoparticle dispersion according to Example 3. Furthermore, parameters like temperature, adsorption time, exfoliated graphite concentration, ultrasound intensity and treatment time were kept constant, whereas the ZnO nanoparticles concentration of the stock solution was diluted stepwise from 100% SL (0.8 g/l) to 10% SL (0.08 g/l) for further composite formation. Compared to the solution of ZnO nanoparticles of Example 3 (100% stock solution) the concentrations are depicted in the following table:

TABLE 1

| Example | Concentration ZnO stock solution compared to Example 3: |
|---|---|
| 3 | 100% |
| 3a | 80% |
| 3b | 70% |
| 3c | 60% |
| 3d | 50% |
| 3e | 40% |
| 3f | 30% |
| 3g (comparative) | 20% |
| 3h (comparative) | 10% |

Comparative Example 4: Example 1 was repeated but no ultrasound impact at all was used.

Comparative Example 5: Example 3 was repeated but no ultrasound impact at all was used.

These two comparative examples represent coating experiments of the initial graphite without exfoliation.

A2 Primary Coated Tempered Composites b)

Examples 4 to 11 and Comparative Example 6

The preparation of Example 3 was repeated several times. The thus primary coated composites where tempered under $N_2$ atmosphere in a muffle oven. The temperature was raised by 10° C./min in each case until the final temperature was reached and remained there for 1 h. After cooling back to room temperature the samples were collected. The temperatures were varied from 420° C. (Example 4) to 800° C. (Comparative Example 6) and are depicted in table 3 for the various examples.

Example 12 to 17 and Comparative Example 7

The procedure was the same as in Examples 4 to 9, but instead of using an inert $N_2$ atmosphere the samples were tempered in a $H_2/N_2$ (10%/90% v/v) atmosphere at final temperatures of 350° C., 400° C.; 450° C., 500° C., 550° C., 600° C. and at 800° C. (Comparative Example 7). Details are depicted in table 3.

A3 Secondary Coated Composites c)

Examples 18 to 22

The primary coated and tempered composites of Examples 4, 5, 7, 8 and 9 were further coated with ZnO nanoparticles according to the method of Example 3 (post) yielding secondary coated composites of Examples 18 to 22.

Furthermore the primary coated and tempered composites of Example 14, was further coated with ZnO nanoparticles according to the method of Example 3 (post) yielding secondary coated composites of Example 23.

A4 Secondary Coated and Tempered Composites d)

Example 24

Example 20 of secondary coated composites c) which is based on example 7, was tempered in $N_2$ atmosphere at 600° C. as described above.

Comp. Example 8: A composite was prepared according to the method of Example 3 (post), but instead of ZnO particles prepared chemically commercially available ZnO zinc oxide (NanoArc™ Zn-0605, Alfa Aesar, 40-100 nm APS Powder) was used. It was mixed with separately prepared exfoliated graphite according to Comparative Example 2. Thereafter the compound was tempered in $N_2$ atmosphere at 600° C. in analogy to Example 7.

B Detailed Characterization of Examples and Comparative Examples

B 1 TEM and SEM Analysis:

A scanning electron microscope (SEM; Supra 35, Zeiss) and a transmission electron microscope (TEM; EM 912 Omega, Zeiss) were used to determine the morphology and size distributions of pristine and composite materials. For SEM: The samples were analyzed in the microscope with an operating voltage of 1 kV and 1.5 kV, respectively. For TEM: the samples were dissolved in isopropanol using the ultrasound and deposited on 200 mesh copper grids (Lacey). The samples were investigated in the microscope at an acceleration voltage of 200 kV. For each sample, the size of more than 100 particles was measured to obtain the average size. The magnifications used in TEM analysis were: 6,000×, 12,500×, 25,000× and 50,000×.

B 1.1: Primary Coated Composites of Type a):

FIG. 1 displays exemplary TEM (A-C) and SEM (D-F) pictures of Examples 1 to 3. The TEM pictures show a widely homogeneous coverage of the exfoliated graphite sheets with ZnO nanoparticles in isolated or aggregated form. These pictures do not display whether the coverage of the graphite sheets occurred on both sides of the substrate. Therefore additional SEM pictures were made. Here it is detectable that indeed the ZnO nanoparticles cover the graphite sheets on both sides, especially in picture E. A homogeneous coverage of the substrates with the nanoparticles is also seen on these pictures. Especially for the sample of Example 3 (post, picture F) a very homogeneous coverage can be seen. The pictures D and E display a certain island formation which is most likely attributable to drying phenomena by preparing the samples for SEM.

All samples of Examples 1 to 3 were redispersed in isopropanol using ultrasound for about one minute. The dispersabilty was very good in each case. After 24 h only a very slight sedimentation of the black composite materials occurred.

Further analysis with TEM and SEM showed that al ZnO nanoparticles were adsorbed on the support surface and no detectable loss of coverage was detectable.

The composite materials of Examples 1 to 3 can therefore easily be further processed in form of a dispersion or as a powder.

Furthermore the particle size distributions were evaluated by TEM for Examples 1 to 25 by counting at least 70 particles. The results are shown in table 3. The primary coated composites of type a) (Examples 1 to 3) show small nanoparticles of average diameter $d_{ZnO}$ of about 5 nm with a rather narrow standard deviation. There are essentially monodisperse nanoparticles.

The primary coated and tempered composite of type b) show larger average diameters with increasing temperature of the tempering step due to Ostwald ripening. Also the standard deviation increases in absolute values and as a relative standard deviation. In FIG. 2 TEM pictures at the same magnification and the corresponding histogramms of the particle distributions are shown. The examples are indicated by the temperature. At 420° C. the particle size changes are still rather small. After 500° C. the particle sizes continues to increase with increasing temperature.

In case of composite of type c bimodal particle size distributions were found as indicated in table 3. Here the particle size of the grown ZnO nanoparticles overlap with the small particle size of the new formed ZnO nanoparticles.

B 2 FT-IR Spectroscopy

Apparently the ZnO nanoparticles are bound quite stable to the exfoliated graphite support. To determine the surface chemistry of the graphite and the composite was studied with FTIR measurements. Samples were pelletized with KBr and a FTIR spectrometer was used (Nicolet iS10, Thermo Fischer Scientific) in the transmittance mode. FT-IR spectra were collected from 4000 to 400 cm$^{-1}$ with a step size of 1.929 cm$^{-1}$.

Figure 3A:
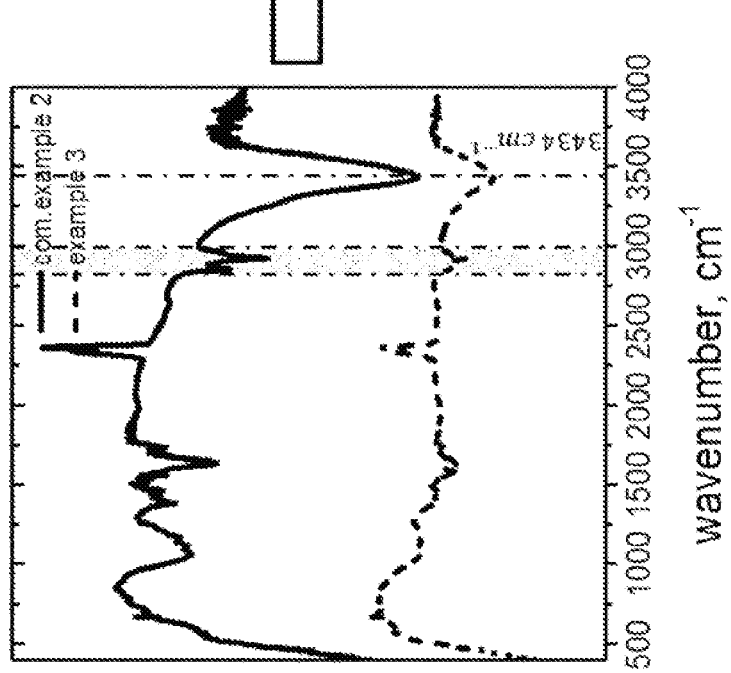

The graphite pure materials of comparative example 2 and the composite material of Example 3 were characterized by FT-IR spectroscopy. In FIG. 3a the first picture displays the FT-IR spectrum of two samples where the solid line represents the initial graphite (comparative example 1) and the lower spectrum the composite (Example 3) with a corresponding zoom in spectra of FIG. 3 b.

The spectrum of the pure graphite exhibits peaks at 3434 cm$^{-1}$, 1735 cm$^{-1}$, 1634 cm$^{-1}$, 1384 cm$^{-1}$, 1060 cm$^{-1}$ corresponding to O—H stretching vibrations of H$_2$O molecules, C=O stretching vibrations of COOH groups, skeletal vibrations of C=C, O—H deformations of the C—OH groups and C—O vibrations, respectively. Moreover, the peaks at 2852 cm$^{-1}$, 2922 cm$^{-1}$ and 2957 cm$^{-1}$ correspond to the stretching vibration of —CH, —CH$_2$, and —CH$_3$ functional groups, respectively.

In the spectrum of the composite (ZnO@EG), the characteristic peaks of C—OH and C=O obviously turn weak or completely disappear indicates the successful attachment of ZnO nanoparticles on exfoliated graphite sheets (Hong, W.; Li, L. Z.; Xue, R. N.; Xu, X. Y.; Wang, H.; Zhou, J. K.; Zhao, H. L.; Song, Y. H.; Liu, Y.; Gao, J. P., One-pot hydrothermal synthesis of Zinc ferrite/reduced graphene oxide as an efficient electrocatalyst for oxygen reduction reaction. *Journal of Colloid and Interface Science* 2017, 485, 175-182 and Zhou, X. F.; Hu, Z. L.; Fan, Y. Q.; Chen, S.; Ding, W. P.; Xu, N. P., Microspheric organization of multilayered ZnO nanosheets with hierarchically porous structures. *J. Phys. Chem. C* 2008, 112 (31), 11722-11728). Furthermore, a spectrum changes can be detected in the range of 574 cm$^{-1}$ confirming the successful adsorption of ZnO Nanoparticles. (Sankapal, B. R.; Gajare, H. B.; Karade, S. S.; Salunkhe, R. R.; Dubal, D. P., Zinc Oxide Encapsulated Carbon Nanotube Thin Films for Energy Storage Applications. *Electrochim. Acta* 2016, 192, 377-384). Moreover, no characteristic peaks of acetate residues assigned to primary zinc salt of Example 3 were obtained, indicating impurity-free composite formation.

B3 Determination of the ZnO Content and Coverage

B3.1 Primary Coated Composites:

The content of ZnO nanoparticles was determined using four methods: EDX, ICP-OES and XRD.

ICP-OES (Ciros SOP, SPECTRO) was performed to analyze the elemental composition of HCl: H$_2$O$_2$ (1:1) digestion.

The energy dispersive X-ray spectroscopy (EDX, X-Max$^N$ 150, Oxford Instruments) was used to analyze the chemical composition of composite micro region. The samples were analyzed with working distance of 6-8.5 mm and an operating voltage of 3 kV.

The Brunauer-Emmett-Teller (BET) method based on nitrogen adsorption/desorption was measured with a Belsorp mini (BEL Japan, Inc.) at 77 K was used to determine the specific surface area of the graphite substrates. Prior to the measurement, the samples were degassed 105° C. for 1 h. A 5 point analysis method was used.

FIG. 4B displays an overview of an exemplary EDX spectra of example 3. It can be well seen that no elements other than C, Zn, and O are present in the sample.

In table 2 the element composition of Examples 4 to 9 as determined by EDX.

TABLE 2

Results of EDX analysis of the composition of tempered primary coated composites of type b):

| Sample | Temperature tempering step/ ° C. | Elemental Analysis in atomic-% with standard deviations | | |
|---|---|---|---|---|
| | | C | Zn | O |
| Example 4 | 420 | 94.6 ± 0.4 | 3.4 ± 0.2 | 2.0 ± 0.3 |
| Example 5 | 500 | 95.4 ± 0.8 | 2.7 ± 0.5 | 1.9 ± 0.4 |
| Example 6 | 550 | 95.2 ± 0.9 | 2.5 ± 0.4 | 2.6 ± 0.6 |
| Example 7 | 600 | 94.3 ± 0.6 | 3.4 ± 0.4 | 2.3 ± 0.3 |
| Example 8 | 650 | 93.4 ± 0.5 | 4.0 ± 0.3 | 2.6 ± 0.3 |
| Example 9 | 700 | 92.8 ± 3.2 | 4.1 ± 1.2 | 3.2 ± 2.1 |
| Comp. Example 4 | 800 | 98.5 ± 0.2 | 0 | 1.5 ± 0.2 |

No further elements were found in an amount above 0.1 wt.-% by EDX analysis.

The inventive composites are clearly composed only from ZnO and graphite materials.

In FIG. 4A the results of the ZnO content in wt.-% of the composites of Examples 1 to 3. The values are also displaced in table 3. Basically the concentration of ZnO is about the same for all three samples 1 to 3 of primary coated composites a). The post method of example 3 leads to slightly lower values which is attributed to the best formation of isolated ZnO nanoparticles of the surface of exfoliated graphite sheets. When using the syn or pre method of synthesis the nucleation of the ZnO nanoparticles will start at least partly on the surface of exfoliated graphite leading to slightly higher ZnO contents.

The values obtained by EDX have a large variation as shown by the quite large standard deviations, because the intensity of the signal obtained depends in an non linear manner on the lateral penetration depth of the electrons into the probe material. The values obtained are therefore not exact.

For determining the content of ZnO nanoparticles in the composite the ICP-OES method is most preferred because of it's simplicity and high precision. The concentrations $c_{ZnO}$ depicted in table 3 were determined by the ICP-OES method.

If one would like to characterize the degree of coverage of the support with ZnO nanoparticles the absolute value of the ZnO content in wt.-% is not that meaningful as the specific surface of the exfoliated graphite may change by either choosing different support materials from the very beginning or by changes in the degree of exfoliation caused by the ultrasound impact used during the coating steps of ZnO nanoparticles. Fortunately the specific surface $\beta_c$ can be measured by removing the ZnO nanoparticles at 800° C. in inert atmosphere as described above. The specific surface of the exfoliated graphitic support material does not change by this thermic treatment.

The ratio $c_{ZnO}/\beta_c$ is much more meaningful as here the effect of different specific surfaces of the exfoliated graphite substrate is diminished. This ratio is depicted in table 3 for all inventive examples and some of the comparative examples.

Furthermore the coverage Op, was calculated for the species a) and b) by the following formula:

$$\theta_{pr} = \frac{3}{2} \cdot \frac{c_{ZnO}}{1-c_{ZnO}} \cdot \frac{1}{\rho_{ZnO} r_{pr,se} \beta_c} \quad (VI)$$

wherein $c_{ZnO}$ is the mass quotient of the mass of ZnO to the sum of the masses of ZnO and exfoliated graphite, $r_{pr,se}$ is the mean radius of the ZnO primary particles as determined by TEM (which means half of the diameter), $\rho_{ZnO}$ is the density of the ZnO nanoparticles g/cm³) and $\beta_c$ is the specific surface (BET) of the support material.

This parameter based on formula (VI) an be attributed in a meaningful manner only to primary coated particles a) or b). Therefore, it was not calculated for all the examples of secondary coated composites.

For the first three Examples 1 to 3 exhibit a quite similar coverage. These coverages are quite close to the theoretical value of 54% for a monolayer of densely packed spherical ZnO nanoparticles. Therefore the coverage of the exfoliated graphite with ZnO nanoparticles can be regarded as to be almost complete by all of the methods of preparation.

Adsorption Process (Examples 3a to 3f):

With decreasing concertation of ZnO nanoparticles in diluted stock solution, a lower amount of adsorbed particles on the EG surface could be expected. FIG. 5 shows the concentration of ZnO nanoparticles in the diluted stock solutions, which was used for the further composite formation. A linear correlation between ZnO nanoparticles concentration and proportional diluted stock solution can be obtained. Furthermore, the concentration of not adsorbed ZnO nanoparticles was determined by ICP-OES in remain dispersion after adsorption process. Depending on the concentration of applied stock solution, three different adsorption domains could be observed. First domain I (10%-20% stock solution) reveals the complete adsorption of nanoparticles due to the absence of free ZnO nanoparticles in remain dispersion. The second domain II (30%-40% stock solution) represents the intermediary phase, combining two processes, the continuous adsorption of nanoparticles and initial surface saturation. The third domain III (>50% stock solution) exhibits the saturation of surface coverage, which indicates presence of ZnO nanoparticles monolayer. The concentration of adsorbed nanoparticles remains unaffected by further increase of ZnO nanoparticles concentration, whereas the concentration of free ZnO nanoparticles increases continuously.

The adsorption progress (with increasing concentration of ZnO nanoparticle diluted stock solution) for the Examples 3a to 3h can be visualized by plotting the surface coverage calculated by formula (VI) as a function of the proportional diluted stock solution (FIG. 6). This figure contains two more Examples 3b and 3c at 70% and 60% stock solution concentration which were not included in table 3. Rapidly increase of the surface coverage can be monitored below the 50% stock solution, whereas no significant changes can be detected above 50% stock solution. These asymptotical characteristics of ZnO nanoparticles adsorption on exfoliated graphite result from surface saturation. Since the adsorption of ZnO nanoparticles was irreversible and the nanoparticles adsorbed one by one at random locations on the exfoliated graphite surface, the theoretical model of random sequential adsorption of monodisperse hard spheres with maximum possible coverage of 54% (jamming limit) could be applied (Schaaf, P.; Talbot, J., Surface Exclusion Effects in Adsorption Processes. *J. Chem. Phys.* 1989, 91 (7), 4401-4409; Schaaf, P.; Voegel, J. C.; Senger, B., From random sequential adsorption to ballistic deposition: A general view of irreversible deposition processes. *J. Phys. Chem. B* 2000, 104 (10), 2204-2214).

As long as exfoliated graphite surface existed in excess the nanoparticles adsorbed continuously until complete coverage occurs and no further particles attachment take place. Due to the application of diluted ZnO nanoparticles stock solution the surface coverage can be controlled and directly adjust up to 40%. The present composite does not achieved the maximal possible surface coverage of theoretical limit of 54%.

The presence of the blank areas on the TEM images at the saturation domain confirms the incomplete surface coverage. Enhancement of the surface coverage can be obtained due to the longer adsorption time at concentration above 50% SL.

The Examples 3g and 3h (20% and 10% stock solutions) were regarded to be rather comparative examples as here the loading of the exfoliated graphite parameter $c_{ZnO}/\beta_c$ was below 0.2. Such composites are regarded as to be not too different from pure exfoliated graphite, because of their low ZnO content.

TABLE 3

Results of particle size analysis and of the determination of $\beta_c$ and various expressions of the concentration of ZnO nanoparticles in the composites

| Sample/ Temperature*/ conditions of tempering | Type of composite | Particle size ZnO by TEM | | Specific surface (BET) of graphite substrate $\beta_c$ [m²/g] | Concentration or coverage of ZnO | | |
|---|---|---|---|---|---|---|---|
| | | $d_{1,ZnO} \pm$ standard deviation [nm] | $d_{2,ZnO} \pm$ standard deviation [nm] | | $c_{ZnO}$ [wt.-%] | $c_{ZnO}/\beta_c$ [Wt.-% g/m²] | $\theta_{pr}$ |
| Example 1 | a (syn) | 5.2 ± 0.9 | — | 30.9 | 12.15 | 0.39 | 46.4 |
| Example 2 | a (pre) | 5.2 ± 0.9 | — | 30.9 | 12.85 | 0.42 | 49.5 |
| Example 3 | a (post) | 4.7 ± 0.7 | — | 30.9 | 10.5 | 0.33 | 37.9 |

TABLE 3-continued

Results of particle size analysis and of the determination of $\beta_c$ and various expressions of the concentration of ZnO nanoparticles in the composites

| Sample/ Temperature*/ conditions of tempering | Type of composite | Particle size ZnO by TEM | | Specific surface (BET) of graphite substrate $\beta_c$ [m²/g] | Concentration or coverage of ZnO | | |
|---|---|---|---|---|---|---|---|
| | | $d_{1,ZnO}$ ± standard deviation [nm] | $d_{2,ZnO}$ ± standard deviation [nm] | | $c_{ZnO}$ [wt.-%] | $c_{ZnO}/\beta_c$ [Wt.-% g/m²] | $\theta_{pr}$ |
| Example 3a | a (post) 80% SL** | " | | 30.9 | 9.45 | 0.31 | 35.0 |
| Example 3d | a (post) 50% SL | " | | 30.9 | 9.75 | 0.32 | 36.3 |
| Example 3e | a (post) 40% SL | " | | 30.9 | 7.85 | 0.25 | 28.6 |
| Example 3f | a (post) 30% SL | " | | 30.9 | 7.6 | 0.25 | 27.4 |
| Comparative Example 3g | a (post) 20% SSL | " | | 30.9 | 5.6 | 0.18 | 19.9 |
| Comparative Example 3h | a (post) 10% SL | " | | 30.9 | 3.3 | 0.11 | 11.5 |
| Comparative Example 4 | Syn a | | | 24.1 | 1.4 | 0.06 | — |
| Comparative Example 5 | Post a | | | 24.1 | 1.5 | 0.06 | — |
| Example 4 420° C./N₂ | b | 7.4 ± 2.5 | — | 30.9 | 10.65 | 0.34 | 29.4 |
| Example 5 500° C./N₂ | b | 13.7 ± 5.3 | — | 30.9 | 11.2 | 0.36 | 16.8 |
| Example 6 550° C./N₂ | b | 17.9 ± 8.0 | — | 30.9 | 11.55 | 0.37 | 13.3 |
| Example 7 600° C./N₂ | b | 42.2 ± 17.3 | — | 30.9 | 10.25 | 0.33 | 4.9 |
| Example 8 650° C./N₂ | b | 53.7 ± 17.5 | — | 30.9 | 10.9 | 0.35 | 4.2 |
| Example 9 700° C./N₂ | b | 77.3 ± 30.8 | — | 30.9 | 10.9 | 0.35 | 2.9 |
| Example 10 720° C./N₂ | b | 121.1 ± 80.3 | | 30.9 | 6.6 | 0.21 | 1.1 |
| Example 11 750° C./N₂ | b | 215.5 ± 151.5 | | 30.9 | 6.0 | 0.19 | 0.5 |
| Comparative Example 6 800° C. | b | | | | 0.06 | 0.002 | — |
| Example 12 350° C./N₂/H₂ | b | 7.4 ± 2.5 | | 29 | 9.02 | 0.31 | 24.6 |
| Example 13 400° C./N₂/H₂ | b | 9.4 ± 3.2 | | 29 | 9.35 | 0.32 | 20.4 |
| Example 14 450° C./N₂/H₂ | b | 18.4 ± 8 | | 29 | 9.03 | 0.31 | 9.8 |
| Example 15 500° C./N₂/H₂ | b | 28.9 ± 14.5 | | 29 | 9.7 | 0.33 | 6.9 |
| Example 16 550° C./N₂/H₂ | b | 35.3 ± 13.7 | | 29 | 9.3 | 0.32 | 5.4 |
| Example 17 600° C./N₂/H₂ | b | 154.5 ± 66 | | 29 | 7.7 | 0.26 | 1 |
| Comparative Example 7 800° C./N₂/H₂ | b | | | 29 | 0.1 | 0.003 | |
| Example 18 420° C./N₂ | c | 4.7 ± 0.7 | 7.4 ± 2.5 | 30.9 | 14.95 | 0.48 | — |
| Example 19 NTB 500° C./N₂ | c | 4.7 ± 0.7 | 13.7 ± 5.3 | 30.9 | 16.65 | 0.53 | — |
| Example 20 NTB 600° C./N₂ | c | 4.7 ± 0.7 | 17.9 ± 8 | 30.9 | 18.6 | 0.6 | — |
| Example 21 NTB 650° C./N₂ | c | 4.7 ± 0.7 | 42.2 ± 17.3 | 30.9 | 18.65 | 0.6 | — |
| Example 22 NTB 700° C./N₂ | c | 4.7 ± 0.7 | 77.3 ± 30.8 | 30.9 | 18.9 | 0.61 | — |
| Example 23 NTB 450° C./ N₂/H₂ | c | 4.7 ± 0.7 | 18.4 ± 8.0 | 29 | 14.8 | 0.51 | |
| Example 24 600° C./600° C./ N₂ | d | | 46.0 ± 16.8 | 30.9 | 18.7 | 0.61 | |

TABLE 3-continued

Results of particle size analysis and of the determination of $\beta_c$ and various expressions of the concentration of ZnO nanoparticles in the composites

| Sample/ Temperature*/ conditions of tempering | Type of composite | $d_{1,ZnO}$ ± standard deviation [nm] | $d_{2,ZnO}$ ± standard deviation [nm] | graphite substrate $\beta_c$ [m²/g] | $c_{ZnO}$ [wt.-%] | $c_{ZnO}/\beta_c$ [Wt.-% g/m²] | $\theta_{pr}$ |
|---|---|---|---|---|---|---|---|
| Example 25 450° C./450° C. $N_2/H_2$ | d | | 24.2 ± 12.8 | 29 | 14.7 | 0.51 | |
| Comparative example 8 | — | | | 30.9 | 10 | 0.32 | |

*temperature for tempered samples
**SL: stock solution; denotes to concentration of Zn-salt in % compared to Example 3.

When tempering the primary coated composites at different temperatures the ZnO content was essentially constant for temperatures of 420 to about 700° C. At 800° C. the ZnO particles, however, were almost completely disappeared, probably by sublimation. Therefore, the sample at this temperature was a comparative example.

The disappearance of the ZnO nanoparticles at this temperature was attributed to carbothermic reductions:

$$ZnO+C \rightarrow Zn+CO \qquad (VIII)$$

$$ZnO+CO \rightarrow Zn+CO_2 \qquad (IX)$$

The formation of CO and $CO_2$ could be detected by STA-MS (simultaneous thermic analysis mass spectroscopy) when monitoring the desorption process. There it was found that first signals of $CO_2$ could be detected already at about 300° C. The reaction rate increases with increasing temperature and finally the ZnO particles disappeared at around 800° C. The elemental Zn particles are supposed to be sublimated at 800° C. When tempering in an inert and reducing atmosphere of $N_2/H_2$ the formation of Zn-rich phases by reduction of ZnO is even more forced which has beneficial aspects of the electrochemical behavior.

Thus also in an inert atmosphere reduction processes of the ZnO nanoparticles can occur at elevated temperatures due to the carbon and intermediate carbon monoxide.

For the sample of Example 4 showed a lower content compared to the other examples, because at a temperature of 420° C. the ZnO particles have not grown very much and therefore only few places of the graphite support have become free for new ZnO nanoparticles.

For all samples of Examples 5 toll the average particles size of the ZnO nanoparticles increased with increasing tempering temperature due to Ostwald ripening. Also the particles size distribution became broader as can been seen in the values of the standard deviation.

In case of the Examples 12 to 17 which were treated in a $H_2/N_2$ atmosphere the ZnO reduction starts at much lower temperature as direct reduction from the gas phase can occur. Larger diameters for these samples are obtained if one compares samples of inert atmosphere tempering at the same temperature, e.g. Example 16 compared with Example 6. The earlier ZnO reduction in $H_2/N_2$ atmosphere is supposed to imply nucleation processes and therefore higher Ostwald ripening.

The concentration of ZnO nanoparticles is kept essentially constant within some statistical variations (the accuracy is about 1.5 wt.-%). Only at higher temperatures (720° C. for inert atmosphere tempering, see Example 10 or for 600° C. for reducing atmosphere tempering, see Example 17) a decrease in the ZnO concentration can be seen which commences with higher temperatures. At 800° C. no ZnO is observable any more (Comp. Examples 6 and 7).

The coverage decreases dramatically with increasing temperature which is mainly due to the increasing particle diameter.

Thus with increasing tempering temperature more and more parts of the surface of exfoliated graphite substrate becomes free and is accessible for adsorption of ZnO again.

B3.2 Secondary Coated Particles c).

In FIG. 7 an exemplary TEM picture of Example 7 is shown. The two different particle sizes of the tempered particles and the freshly coated particles can be separated well due to their difference in size and form. The small fresh particles are rather spherical while the tempered, larger particles tend to different morphology. Even for Example 14 where the particle size distributions characterized by average particle diameter and it's standard deviation seem to overlap, the different particle shapes allowed a separate determination of the two particle distributions.

B4 XRD Analysis:

X-ray diffractograms of the powder samples were recorded at room temperature using a Philips, X'Pert MPD PW 3040 diffractometer with a Cu-Kα source (wavelength=1.54178 Å) using 2θ step size of 0.02°. The software used for analysis was X'Pert High Score Plus 4.1. Analysis further based on using the data base ICDD PDF-4.

From XRD diffractogramms various information about the composite materials Zn@EG were obtained. The composition can be obtained as well as the crystal structure and the crystallite size of ZnO nanoparticles as well as the degree of graphitization of the support material and the texture (TC)-coefficients. The Rietveld analysis was used throughout for determination of the various parameters.

The crystallinity of EG and as prepared ZnO@EG composite was characterized by X-ray diffraction (XRD) and the results are shown in FIG. 8a with a corresponding zoom in FIG. 8b. The pure EG exhibits six diffraction peak at 2θ=26.4°, 42.3°, 44.5°, 50.6°, 56.5°, and 59.8°, which are attributed to the reflections of (002), (100), (101), (004), (110), and (112) of graphite (ICDD, PDF $N_o$ 00-056-0159). The characteristic graphitic peak (002) was clearly present at 2θ=26.4°. The degree of graphitization g was calculated using the interlayer spacing between single graphene sheets ($d_{002}$) of investigated graphite using the formula:

$$g = \frac{d_{ng} - d_{002}}{d_{ng} - d_g} \qquad (IV)$$

Herein $d_{002}$ is the distance of the lattice planes determined of the measured position of the (002) reflex and calculated according to the Bragg equation, $d_g$=335.4 pm which is a literature value for totally graphitized carbon and $d_{ng}$ represents non-graphitized (turobstatic) carbon with a value of 344 pm (V. A: Davydov, A. V: Rakhmanina, V. Agafonov, B. Narymbetov, J. P. Boudou, H. Szwarc, Conversion of polycyclic aromatic hydrocarbons to graphite and diamond at high pressures, *Carbon* 2004, 42(2), 261-269). Formula (IV) can be applied reliably only for graphites with a range of $d_g$ and $d_{ng}$ as mentioned above. It is not applicable to graphene substrates.

The position of the (002) peak, $d_{002}$ and g is disclosed in table 4 for various examples.

The initial graphite support (comparative example 1) had a degree of graphitization of 95.8%. Due to the ultrasound treatment the graphitization degree of exfoliated graphite decreases from 95.8% to 88%, due to exfoliation and size reduction of initial graphite sheets. Nevertheless, a high degree of graphitization was still obtained. The measured distance of the lattice planes d(002) for the examples is around only 0.3358 to 0.3370 nm.

It should be noted that chemical exfoliated graphene oxide sheets reveal a characteristic diffraction peak at 2θ=12.2° and the enlarged interlayer spacing of 0.74 nm confirms the present of oxygen-containing groups like epoxy groups caused by exposure to oxidizing agent ((N. Son, H. Fan, H. Tian, *Applied Surface Science* 353 2015, 580-587). The diffraction peak at 2θ=12.2° were not detected either for the initial graphite or any exfoliated graphite additionally the interlayer spacing contains 0.34 nm, confirming the abdication of hazardous chemicals during the composite formation process. The presence of noticeable amounts of chemicals would have led to the formation of functional groups on the surface of exfoliated graphite and thus increased interlayer spacing.

For the same reasons the g-value would be only about <50% or even <30% for oxidized graphene.

The results clearly show that the exfoliated graphite substrate is a non-oxidized graphite.

If one compares the g-values of Examples 4 to 9 with the respective examples for secondary coated composites (Examples 14 to 18) for the respective tempering temperatures the g-values for the secondary coated example tend to be lower. This may be explained by an increased amount of disorder. Some ZnO nanoparticles may be incorporated into lattice planes of exfoliated graphite. The same effect can be seen if one compares the g-value for the pure exfoliated graphite (Comparative Example 2) with Examples 1 to 3.

The ZnO@EG composite exhibits not only the diffraction peaks of graphite, but also further diffraction peaks at 2θ=31.7°, 34.3°, 36.1°, 47.4°, 56.5°, 62.7° and 66.3°, which can be ascribed to the reflections of (100), (002), (101), (102), (110), (103) and (112) facets of the wurtzite hexagonal structured ZnO (ICDD, PDF $N_o$ 04-008-8198), respectively. This indicates the successful anchoring of ZnO nanoparticles on the exfoliated graphite surface without changing its basic structure. The XRD pattern exhibits no peaks from impurities confirming the high purity of ZnO nanoparticles.

Regarding the ZnO signals the texture TC(hkl) was further analyzed which is directed to the distribution of the crystallographic orientation of the ZnO nanoparticles in the composites. The "texture coefficient" TC for a lattice plane <hkl> can be calculated from the intensities $I_0$(hkl) (obtained by a data base) and the measured intensities I(hkl) by equation (X):

$$TC(hkl) = \frac{\frac{I(hkl)}{I_0(hkl)}}{\frac{1}{i}\Sigma_i \frac{I(hkl)}{I_0(hkl)}} \qquad (X)$$

Here i represents the number of the measured peaks. If TC(hkl) a statistical orientation occurs with respect to the specific (hkl) plane. If TC(hkl)>1 a predominant orientation with respect to the specific (hkl) plane occurs. A complete orientation in the direction of the plane (hkl) would lead to a coefficient TC=i. (L. Spieß, G. Teichert, R. Schwarzer, H. Behnken, C. Genzel, *Moderne Röntgenbeugung*, Vieweg+Teubner, Wiesbaden, 2009).

FIG. 9 shows that the primary coated composite of type a) of Example 3 (herein labeled as Ref) and for the primary tempered composites of type b) of Example 3, 4 and Examples 7 to 9. The primary coated composite of Example 3 exhibits a predetermination in the <002> plane whereas with increasing temperature the preorientation changes to the <001> direction. In table 4 TC(100), TC(002) and the ratio of these texture coefficients are depicted for various samples.

The primary coated composites (Examples 1 to 3) have a large TC(002) value. This can be attributed to the epitaxial growth of the ZnO on the graphite surface which is oriented into mainly the (002) lattice direction. After tempering (Examples 4 to 9) the ZnO particles grow in particle size. The TC(001) increases whereas the TC(002) decreases.

As mentioned above during tempering not only an Ostwald ripening process occurs, but at the same time a carbothermal reduction as represented by the processes mentioned above (reactions of formula (VIII) and (IX)). The (001) lattice plain is perpendicular to the (002) lattice plain and it's increase is believed to be explained with the formation of phases enriched with elemental zinc in the growing ZnO crystals. Such Zn rich phases could also be detected by EDX analysis of cross sections of the samples of composite type b.

TABLE 4

Characterization of composites of exfoliated graphite substrates and ZnO-nanoparticles with various methods:

| Sample | Type of composite | XRD Characterization (Rietveldt analysis) | | | | | |
| --- | --- | --- | --- | --- | --- | --- | --- |
| | | Characterization of support | | | Characterization of ZnO | | |
| | | g/% | $d_{002}$/nm | Position ($d_{002}$) | TC(100) | TC(002) | TC(100)/TC(002) |
| Comparative Example 1 | — | 95.3 | 0.3358 | 26.5° | — | — | — |
| Comparative Example 2 | — | 88.4 | 0.3364 | 26.5° | — | — | — |

TABLE 4-continued

Characterization of composites of exfoliated graphite substrates and ZnO-nanoparticles with various methods:

| Sample | Type of composite | Characterization of support g/% | $d_{002}$/nm | Position ($d_{002}$) | TC(100) | TC(002) | TC(100)/TC(002) |
|---|---|---|---|---|---|---|---|
| Example 1 | a | 86.0 | 0.3366 | 26.5° | 1.07 | 1.14 | 0.94 |
| Example 2 | a | 87.2 | 0.3365 | 26.5 | 0.97 | 1.37 | 0.71 |
| Example 3 | a | 84.9 | 0.3367 | 26.5 | 1.06 | 1.16 | 0.91 |
| Example 4 420° C./$N_2$ | b | 88.4 | 0.3364 | 26.5 | 1.07 | 1.14 | 0.93 |
| Example 5 500° C./$N_2$ | b | 91.9 | 0.3361 | 26.5 | 1.07 | 1.14 | 0.93 |
| Example 6 550° C./$N_2$ | b | 87.2 | 0.3365 | 26.5 | 1.07 | 1.14 | 0.93 |
| Example 7 600° C./$N_2$ | b | 90.7 | 0.3362 | 26.5 | 1.08 | 1.1 | 0.98 |
| Example 8 650° C./$N_2$ | b | 84.9 | 0.3367 | 26.5 | 1.13 | 1.02 | 1.11 |
| Example 9 700° C./$N_2$ | b | 92.5 | 0.3360 | 26.5 | 1.19 | 0.96 | 1.24 |
| Example 10 720° C./$N_2$ | b | 88.4 | 0.3364 | 26.4 | 1.1 | 1.0 | 1.1 |
| Example 11 750° C./$N_2$ | b | 84.9 | 0.3367 | 26.4 | 1.1 | 1.0 | 1.1 |
| Comparative Example 6 800° C. | b | 92.8 | 0.3360 | 26.5 | | | |
| Example 12 350° C./$N_2/H_2$ | b | 83.7 | 0.3368 | 26.4 | 1.06 | 1.17 | 0.91 |
| Example 13 400° C. $N_2/H_2$ | b | 87.2 | 0.3365 | 26.5 | 1.07 | 1.16 | 0.92 |
| Example 14 450° C./$N_2/H_2$ | b | 83.7 | 0.3368 | 26.4 | 1.06 | 1.13 | 0.94 |
| Example 15 500° C./$N_2/H_2$ | b | 87.2 | 0.3365 | 26.5 | 1.05 | 1.11 | 0.95 |
| Example 16 550° C./$N_2/H_2$ | b | 86 | 0.3366 | 26.5 | 1.08 | 1.07 | 1.0 |
| Example 17 600° C./$N_2/H_2$ | b | 88.4 | 0.3364 | 26.5 | 1.07 | 1.06 | 1.0 |
| Example 18 420° C. | c | 86.0 | 0.3366 | 26.5 | 1.07 | 1.13 | 0.95 |
| Example 19 500° C. | c | 81.8 | 0.3370 | 26.4 | 1.08 | 1.09 | 0.99 |
| Example 20 600° C. | c | 88.4 | 0.3364 | 26.5 | 1.05 | 1.08 | 0.97 |
| Example 21 650° C. | c | 85 | 0.3367 | 26.5 | 1.08 | 1.03 | 1.05 |
| Example 22 700° C. | c | 87.2 | 0.3365 | 26.5 | 1.13 | 0.98 | 1.15 |
| Example 23 450° C./$N_2/H_2$ | c | 73.3 | 0.3377 | 26.4 | 1.02 | 1.18 | 0.86 |
| Example 24 600° C./600° C./$N_2$ | d | 87.2 | 0.3365 | 26.5 | 1.1 | 1.03 | 1.07 |
| Example 25 450° C./450° C. $N_2/H_2$ | d | 79.1 | 0.3372 | 26.4 | 1.04 | 1.14 | 0.91 |
| Comparative Example 8 800° C. | — | 80.2 | 0.3371 | 26.4 | 1.04 | 1.07 | 0.97 |

B5 Determination of Zn-Content with EDX:

The composite samples were suspended in a mixture of EpoFix Resin and EpoFix Hardener (25:3) both from Struers, Germany. The mixture was drawed-down onto a foil and dried for 24 h. Than the hardened sample was separated mechanically from the foil resulting in thin slices. These were again embedded into an epoxy resin, hardened and then cut into cross-sections. The ZnO nanoparticles were detected with SEM (Zeiss, model Supra 35). EDX was performed at an voltage of acceleration of 3 kV and a distance of 6 to 8.5 mm to the sample. Five to ten individual particles were measured according to their content of zinc and oxygen and the data was averaged. By this method it was avoided to get significant signals from the graphite substrate which contains some oxygen due to adsorbed organic species. As the electrical conductivity of the samples was high enough no additional coatings were necessary.

Figure 10:
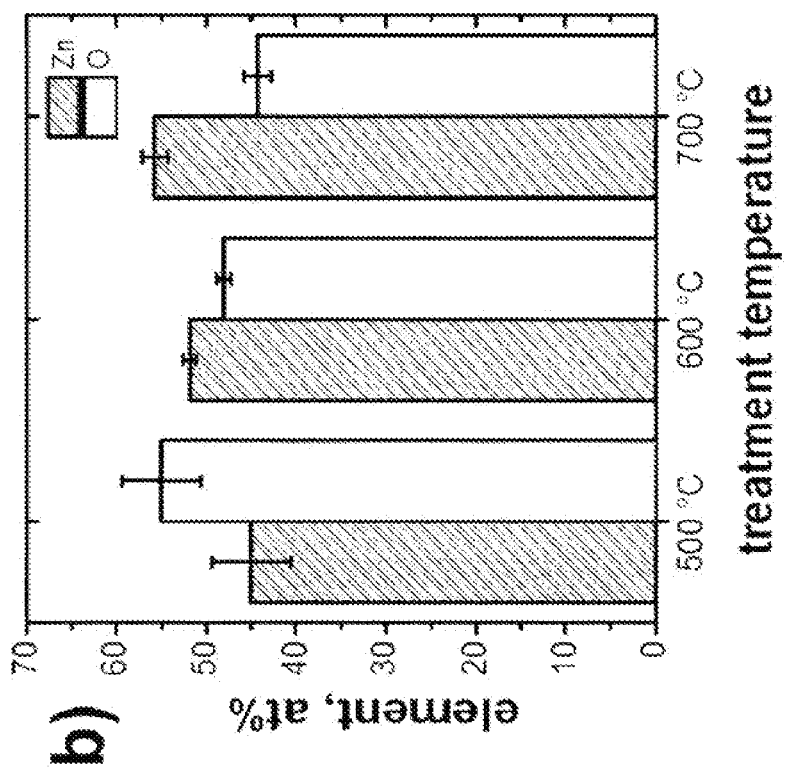

Results are shown exemplary in FIG. 10. FIG. 10 *a*) shows a SEM picture of a cross section typically used for this determination (here for Example 9). In FIG. 10 *b*) the results are shown for Examples 5, 7 and 9. Initially at 500° C. tempering temperature the ZnO is under stoichiometric as the content from oxygen is higher than the content of Zn. With increasing temperature the amount of Zn increases and concomitantly the amount of oxygen decreases. This can be attributed to the formation of Zn, which is likely to form a Zn-rich phase in the ZnO nanoparticles.

C Electrochemical Characterization

C1: Producing of Electrodes:

The electrodes were prepared by mixing the powdered ZnO@EG composites of Comparative Examples 2, 8 and of Examples 3, 6, 7, 9, 10, 11, 12, 13, 14, 15, 16, 17, 20, 22, 23, 24 and 25 with polyacrylic acid (PAA, Sigma Aldrich) and carbon black (DENKA—Denki Kagaku Kogyo KK) at a weight ratio of 60:30:10 in 1-methyl-2-pyrrolidinone solvent (NMP, Merck). The slurry was coated on copper foil (Sigma Aldrich: 99.98%, thickness 20 pm; Schlenk AG; Germany) by using a doctor blade with a spiral of 400 pm and dried under vacuum at 100° C. for 1 h. All of the cells were assembled in an argon-filled dry box with lithium metal (Chempur, 99.8%, thickness 0.5 mm) as the negative electrode. A Whatman separator (Glass Microfiber filter separator) and 1 M $LiPF_6$ electrolyte solution in 1:1 v/v mixture of ethylene carbonate (EC) and diethyl carbonate (DMC) (Selectilyte™ LP 30; BASF) were used to fabricate the coin cells.

C2: Electrochemical Characterization:

Galvanostatic charge/discharge cycles were performed at a voltage range of 5 mV-2 V against $Li/Li^+$ using a CTS LAB (BaSyTec, Germany) testing station. 50 charging/discharging cycles were performed at a constant current of 0.05 C lasting for about 40 h per cycle.

Table 5 shows the results of the cycling experiments. The theoretical capacities were calculated from the theoretical capacities of the bulk materials and the composition of the composite exfoliated graphite/ZnO material. The exfoliated graphite (Comparative example 2) had a rather low capacity value compared to its theoretical capacity. The graphite material chosen here may not have been the best graphite for this purpose. Bearing this in mind, it is remarkable that other composite of Example 7 had reached 79% of the theoretical capacity as calculated by the mass ratios of the two materials. This indicates a synergistic effect of the support material and the coated tempered ZnO nanoparticles.

In column 6 of table 5 a $\Delta C_{sp}$ is shown, which reflects the relative difference of the experimental capacity of a sample referenced to the measured capacity of uncoated exfoliated graphite (Comparative Example 2). It had been calculated as $$\Delta C_{sp} = 100\% \times (C_{sp} - 275 \text{ mAh/g})/275 \text{ mAh/g} \qquad (XI)$$

In FIG. 11 the measured specific capacities are plotted vs. the cycle number for various examples tempered in inert atmosphere (composite type b). The dashed line represents the uncoated exfoliated graphite of Comparative Example 2 having a specific capacity of 275 mAh/g.

All examples with the exception of Example 11 exhibited a quite constant specific capacity during the fifty cycles.

All examples of composite type b) exhibited an increased specific capacity compared to the uncoated exfoliated graphite of Comparative Example 2 except Example 6. The best results of this series were obtained for Example 7 (tempered at 600° C.) and for Example 9 (tempered at 700° C.).

The sample 6 (tempered at 550° C.) exhibited a slight decrease of the specific capacity compared to uncoated exfoliated graphite (Comparative Example 2), but exhibits at least an increasing capacity with increasing cycle number which is unusual. Example 11 (tempered at 750° C.) has only a slightly better specific capacity than Comp. Example 2. Thus the tempering temperature seems to have a strong impact of the electrochemical behavior of the ZnO particles. Without being bound to a theory it is believed that the amount of Zn-rich zones have a beneficial effect. The average particle sizes of ZnO are quite high (42 nm for Example 7 and above 200 nm for Example 11) and do not seem to have a very strong influence on the capacity behavior.

In contrast to composite b) type Example 3 representing composite type a) has a much lower specific capacity than exfoliated graphite of Comp. Example 2 (see table 5).

In FIG. 12 the measured specific capacities are plotted vs. the cycle number for Examples 12 to 16 which were of composite type b, but tempered in reducing atmosphere at different temperatures. The dashed line represents the capacity of uncoated exfoliated graphite of Comparative Example 2.

All examples exhibited a high cycling stability and the specific capacities are increased compared to uncoated exfoliated graphite (Comparative Example 2) and generally they are higher than for the examples tempered in inert atmosphere. Some wave-like curves like e.g. for Example 12 are most likely due to temperature variations during the cycle program as the cycling experiments were made at room temperature in a lab without further tempering. Example 12 (tempered at 350° C.) showed only a small increase compared to Comparative Example 2. The best results were obtained for Example 13 (tempered at 400° C.) which showed a relative increase $\Delta C_{sp}$ of 32% compared to Comparative Example 2 (table 5). Examples 14 to 16 showed a decreasing tendency of the capacity.

As can be depicted from table 5 the specific capacity of Example 17 (tempered at 600° C.), was only slightly higher than Comparative Example 2. This is attributed to a decreased overall concentration of the ZnO nanoparticles (see column 6 in table 3). Apparently the temperature of tempering has again a strong impact, but much lower temperatures are needed to obtain maximum increase of the specific capacity compared to the examples tempered in inert atmosphere.

Like composite a the composites of type c all exhibit decreased specific capacities compared to uncoated exfoliated graphite (Comparative Example 2) as can be seen for Examples 20, 22 and 23 from table 5. This is attributed to the existence of new small ZnO nanoparticles occupying free space of the surface of the exfoliated graphite. These not-tempered ZnO nanoparticles do have a negative impact on the specific capacity of the composite materials as could be already seen for Example 3.

In contrast, composites of type d (tempered twice) have again an increase in the specific capacity compared to uncoated exfoliated graphite (Comparative Example 2) in case of tempering in a reducing atmosphere as can be seen for Example 25 from table 5. The increase is small though and not quite comparable to the strong increase of composites of type b.

To point out the differences of the type of composites the specific capacity vs. cycle number is plotted in FIG. 13 for different Examples tempered at 600° C. in inert atmosphere. The capacity of the composite of type a (here exemplified by Example 3) had a significant lower capacity compared to the uncoated exfoliated graphite. Therefore the initial very small ZnO nanoparticles seem not to enhance the capacity of the material. This material is the precursor of the tempered samples of type b and of all other types of composites. Here only Example 7 (type b) shows a higher capacity than uncoated exfoliated graphite (Comparative Example 2).

The secondary coated composites (Examples 20 and 24) have a capacity in between the sample of Example 7 and Example 3. They contain in a mixture of larger ZnO particles due to the first tempering step and the small ZnO particles from the second coating step. The example 24 which denotes to the composite with two coatings and tempering steps, has a capacity almost reaching the graphite capacity. However, the twofold coating step leads to a very broad range of ZnO particles of different sizes which may not be beneficial for the electrochemical behavior. It may well be, however, that an optimized sample of composite type d) with respect tempering temperature and conditions and the coverages of ZnO particles employed may also show a higher capacity than the pure exfoliated graphite.

Likewise, in FIG. 14 capacities are plotted for Examples tempered at 450° C. in reducing atmosphere. Example 3 representing the composite type a) is again plotted. Here Example 14 (type b) and Example 25 (type d) exhibit higher specific capacities than uncoated exfoliated graphite (Comparative Example 2). Example 23 has a lower capacity, but it is much higher than in case of Example 20 (inert tempered). The average particle sizes of the samples tempered in reducing atmosphere are lower than those of inert atmosphere (compare Example 23 with Example 22 and Example 25 with Example 24; table 3). The particle size seems to have a stronger impact for ZnO particles tempered in reducing atmosphere.

In FIG. 15 the specific capacity vs. cycle number characteristics for the lithiation- and the delithiation process as well as the coulombic efficiency of Comparative Example 8 is depicted. The specific capacity is below 200 mAh/g and therefore much lower than for Example 7. As here the ZnO particles were not synthesized according to the method of this invention but were rather commercially available ZnO nanoparticles, this Comparative Example demonstrates the advantage of the method claimed in this invention. The ZnO nanoparticles of this Comparative Example seem not to be bonded to the graphitic substrate causing a higher resistance at the ZnO/graphite interface. In contrast in the inventive composites the ZnO nanoparticles seem to form bonds to the exfoliated graphite surface as was also indicated by the FT-IR spectra.

TABLE 5

Results of Cycling tests

| Probe | Content ZnO (wt %) | Type of composite | $C_{sp}$ (mAh/g) Experimental | th. $C_{sp}$ (mAh/g) Calculated | $C_{sp}$/th. $C_{sp}$ (%) | $\Delta C_{sp}$/% | CE (%) | # cycles |
|---|---|---|---|---|---|---|---|---|
| Com. Example 2 | — | — | 275 | 372 | 74 | 0 | 95 | 30 |
| Example 3 | 10.5 | a | 21.7 | 435.6 | 5 | −92 | 96 | 50 |
| Example 6 | 11.5 | b | 218.0 | 442 | 46 | −21 | 96 | 50 |
| Example 7 | 10.25 | b | 343.6 | 434 | 79 | 25 | 97 | 50 |
| Example 9 | 10.9 | b | 335.8 | 438 | 77 | 22 | 94 | 50 |
| Example 10 | 6.6 | b | 318.2 | 412 | 77 | 16 | 96 | 50 |
| Example 11 | 6.0 | b | 296.6 | 408 | 73 | 8 | 98 | 50 |
| Example 12 | 6.6 | b | 292.9 | 412 | 71 | 7 | 95 | 50 |
| Example 13 | 7.2 | b | 362.9 | 415 | 87 | 32 | 95 | 50 |
| Example 14 | 8.9 | b | 349 | 426 | 82 | 27 | 96 | 50 |
| Example 15 | 9.7 | b | 346.3 | 430 | 81 | 26 | 97 | 50 |
| Example 16 | 9.3 | b | 332.2 | 428 | 78 | 21 | 95 | 50 |
| Example 17 | 7.7 | b | 297.5 | 418 | 71 | 8 | 99 | 50 |
| Example 20 | 18.6 | c | 54.8 | 484.7 | 11 | −80 | 98 | 50 |
| Example 22 | 18.9 | c | 37.5 | 486.5 | 8 | −86 | 96 | 50 |
| Example 23 | 14.8 | c | 185.4 | 461.6 | 40 | −33 | 94 | 50 |
| Example 24 | 18.7 | d | 240.8 | 485.3 | 50 | −12 | 97 | 50 |
| Example 25 | 14.7 | d | 317.6 | 461.1 | 69 | 15 | 95 | 50 |
| Comp. Example 8 | 10 | — | 148.3 | 432.6 | 34 | −46 | 96 | 50 |

To more clearly show the influences of the average particle size of the ZnO nanoparticles and the content of Zn a plot was made in FIG. 16 of the specific capacity (left axis) and the Zn content as determined with EDX described in part B5 (right axis) versus the average particle diameter for various examples of type b) tempered in inert atmosphere. In order to eliminate the influence of the total concentration of ZnO the specific capacity was calculated as the percentage of the measured capacity with respect to the calculated theoretical capacity. As the total ZnO content influences the theoretical capacity the effect of absolute ZnO concentration is eliminated by this method. The number of the respective Example is shown in the plot. The relative specific capacity increases until a plateau is reached at about 80% capacity at an average particle size of about 40 nm. The Zn content also increases and reaches a constant value of about 58 atom-% at an average particle size of about 80 nm (Example 9). Without being bound to a theory it is believed that a higher Zn content increases the electrical conductivity of the ZnO nanoparticles. Detailed analysis of electrochemical cycling data as well as impedance spectroscopic data could confirm this hypothesis.

Here mainly the Zn content of the ZnO nano particles determines the specific capacity. The size of the particles does not have a predominant effect. The ZnO particles have average sizes exceeding the range of 1 to 10 nm. Thus the beneficial effects of high specific surface leading to reduced diffusion ways of the Li$^+$-ions is not accomplished here.

From table 5 it can be seen that the measured specific capacities of Examples 10 and 11 decrease compared with foregoing Examples 7 to 9. This is attributed to the absolute loss of the ZnO content due to the carbothermic reduction at higher tempering temperatures.

This plateau-value is seen as a temporarily established constant value. The carbothermic reduction of ZnO to Zn (see equations VIII and IX) and the Budouard equilibrium lead to formation of elemental Zn nano particles which sublimate from the graphite surface at higher temperatures as nano particles are known to have a lower point of sublimation than bulk material.

Likewise, a similar plot was made in FIG. 17 for Examples of type b) which were tempered in reduced atmosphere. Here, the capacity shows a very steep increase until about 90% for an average particle diameter of about 9 nm (Example 13) and then a decrease towards 70% for Example 17 with an average particle diameter of about 150 nm. The Zn-content also shows an increase at the beginning but soon (Example 15) reaches a plateau value of about 58 atom-%.

As these reactions start already at lower temperatures first elemental Zn is formed. At increasing temperature (about 720° C., see Examples 10 and 17 in table 3) the overall content of ZnO decreases, which may be attributed to the sublimation of Zn(0) nanoparticles, which have lower boiling points then macroscopic zinc.

The formation of zinc rich ZnO nanoparticles starts at lower temperature due to reduction of ZnO by hydrogen gas. Interestingly, here the influence of particles size can be seen quite well. Particle sizes of about 10 nm seem to be most active and the specific capacity decreases with increasing particle size.

It is well known that during the first cycle of a cycling program the solid electrolyte interface (called SEI) builds up for composite anodes. The formation of this layer imparts less electrochemical activity, because inactive $Li_2O$ is formed. On the other hand this layer needs to have a certain stability. This layer has the effect of an Ohmic resistance due to its low ionic conductance on the anode and therefore the capacity decreases.

In FIG. 18 the resistance $R_i$ before cycling was determined by EIS is plotted against the tempering temperature for various Examples of composite type b). It can be well seen that the resistance is lowered with increasing temperature and that the decrease is stronger for the Examples treated in $H_2/N_2$ atmosphere.

The electrochemical inactivity of the composites of type a), which are precursor material to all other types of composites, is due to such high resistance. The resistance here is as high because ZnO material by itself is a semiconductor and therefore does not have a good electrical conductivity.

After the activation at elevated temperatures ZnO is partly reduced by either the carbothermic reactions for tempering in inert atmosphere or by direct reduction for tempering in reductive atmosphere leading to higher electrical conductivity. Than the stronger theoretical capacity of ZnO in intercalating $Li^+$-ions comes into play which leads to increased specific capacities of the composite.

Furthermore the authors believe that the primarily ZnO nanoparticles a) furthermore block diffusion ways of $Li^+$-ions into the interior graphite substrate. When the ZnO nanoparticles grow during tempering they a size regime where only adsorption on the planes of exfoliated graphite occurs.

The invention claimed is:

1. Composite comprising an exfoliated graphite support material having a degree of graphitization g in a range of 50 to 93%, obtained by XRD Rietveld analysis, wherein g is determined by the formula (IV):

$$g = \frac{d_{ng} - d_{002}}{d_{ng} - d_g} \qquad (IV)$$

wherein $d_{002}$ is the distance of the lattice planes determined of the measured position of the (002) reflex and calculated according to the Bragg equation, $d_g$=335.4 pm which is a literature value for totally graphitized carbon and $d_{ng}$ represents non-graphitized carbon with a value of 344 pm,
wherein said exfoliated graphite support material is coated with ZnO nanoparticles.

2. Composite according to claim 1, wherein the composite has a content of exfoliated graphite and ZnO in a range of 85 to 100 wt.-%, based on the total weight of the composite.

3. Composite according to claim 1, wherein the specific content $c_{sp,ZnO}$ of the ZnO nanoparticles, determined from the formula (V):

$$c_{sp,ZnO} = m_{ZnO}/\beta_{gr} \qquad (V)$$

wherein $m_{ZnO}$ is the content of ZnO in wt.-%, based on the mass of the total composite as determined from ICP-OES and $\beta_{gr}$ is the specific surface determined by BET of the exfoliated graphite support material, is in a range of 0.2 to 0.85 wt-% g/m².

4. Composite according to claim 3, wherein the composite is a primarily tempered composite b) and has a specific content $c_{sp,ZnO}$ of the ZnO nanoparticles, determined from the formula (V):

$$c_{sp,ZnO} = m_{ZnO}/\beta_{gr} \qquad (V)$$

wherein $m_{ZnO}$ is the content of ZnO in wt.-%, based on the mass of the total composite as determined from ICP and $\beta_{gr}$ is the specific surface determined by BET of the exfoliated graphite support material, is in a range of 0.2 to 0.45 wt-% g/m².

5. Composite according to claim 1, wherein the exfoliated graphite material is a non-oxidized graphite.

6. Composite according to claim 1, wherein any of the two basic components exfoliated graphite or ZnO nanoparticles of the composite are not formed on a further support material.

7. Composite according to claim 1, wherein the composites consist of
  a) primary composites, wherein the primary composite is produced by a first coating step of the exfoliated graphite support with ZnO nanoparticles;
  b) primary tempered composites, which are obtained by tempering the primary composites a) in an inert or a reducing gas atmosphere at a temperature of 350 to 750° C.;
  c) secondary composites, obtained by further coating of the primary tempered composites b) with ZnO nanoparticles; or
  d) secondary tempered composites, which are obtained by tempering the secondary composites c) in an inert or a reducing atmosphere at a temperature of 350 to 750° C.

8. Composite according to claim 7, wherein the composites consist of
  a) primarily composites, wherein the primary composite is produced by a first coating step of the exfoliated graphite support with ZnO nanoparticles or b) primarily tempered composites, which are obtained by tempering the primary composites a) in an inert or a reducing atmosphere, wherein the temperature of tempering is in a range of 420° C. to 750° C. when using an inert atmosphere or in a range of 375° C. to 700° C. when using a reducing atmosphere.

9. Composite according to claim 7, wherein at least one tempering step is made in a reducing atmosphere.

10. Composite according to claim 7, wherein the average particle size $d_{1,ZnO}$ of the ZnO nanoparticles in the primary coated composite a) is in a range from 3.0 to 7.0 nm as determined by TEM.

11. Composite according to claim 7, wherein the composite is a primary composite a) or a primary tempered composite b) and the ZnO nanoparticles have a surface coverage $\theta_{pr}$, determined from the equation (VII):

$$\theta_{pr} = \frac{3}{2} \times \frac{c}{1-c} \times \frac{1}{\rho_{ZnO} r_{pr} \beta_{EG}} \quad (VII)$$

wherein c is the mass quotient of the mass of ZnO to the sum of the masses of ZnO and exfoliated graphite, $r_{pr}$ is the mean radius of the ZnO primary particles as determined by TEM, $\rho_{ZnO}$ is the density of the ZnO nanoparticles, $\beta_{EG}$ is the specific surface (BET) of the support material which is exfoliated graphite and wherein $\theta_{pr}$ is in a range of 21 to 54% for primary composites a)
or $\theta_{pr}$ is in a range of 2.5 to 38% for primary tempered composites b).

12. Composite according to claim 7,
wherein the composite is a primary coated composite a) and the TC's derived from the intensities of the XRD reflexes according to the ZnO nanoparticles exhibit TC(100)>0.9, TC(002)>1.1 and TC(100)/TC(002)<1,
or the composite is a primary coated tempered composite b) and the TC's derived from the intensities of the XRD reflexes according to the ZnO nanoparticles exhibit TC(100)>1, TC(002)>0.9 and the ratio TC(100)/TC(002) is in a range of 0.8 to 1.3.

13. Composite according to claim 7, wherein the average particle size $d_{1,ZnO}$ of the ZnO nanoparticles in the primary coated tempered composite b) which was tempered in an inert atmosphere is in a range from 10 to 100 nm as determined by TEM.

14. Composite according to claim 7, wherein the primarily coated tempered composite b) is tempered in reduced atmosphere and the average particle size $d_{1,ZnO}$ of the ZnO nanoparticles is in a range from 7 to 50 nm as determined by TEM.

15. Composite according to claim 7, wherein the composite is a primarily tempered composite b) and has a Zn-content of 52 to 58 atom-% as determined with EDX on cross sections of the composite and measured on single ZnO particles and referenced to Zn— and oxygen content only.

16. Composite according to claim 7, wherein the content of the ZnO nanoparticles is from 3 to 15 wt.-% for the primary coated composites a) and b), based on the total weight of the composite.

17. A method of producing a primary coated composite a) according to claim 7 wherein
A) (syn) the method comprises the following consecutive steps:
 i) a Zn(II)salt is dissolved in a solvent
 ii) graphite and a base are added simultaneously
 iii) the mixture is stirred under impact of ultrasound
 iv) the solvent is removed from the suspension
 or
B) (pre) the method comprises the following consecutive steps:
 i) graphite is suspended in a solvent and exfoliated via impact of ultrasound
 ii) a Zn(II)salt and a base are added simultaneously forming nano-ZnO particles
 iii) the mixture is stirred
 iv) the solvent is removed from the suspension
 or
C) (post) the method comprises the following steps:
 i) a Zn(II)salt and a base are mixed in a solvent in a first reactor forming nano-ZnO particles
 ii) graphite is exfoliated via impact of ultrasound in a second reactor
 iii) both suspensions of i) and ii) are mixed together
 iv) after step iii) the solvent is removed from the suspension.

18. Method of producing a primary tempered composite b) according to claim 7, the method comprising:
producing a primary coated composite a) by the method A), B), or C):
A) (syn) the method comprises the following consecutive steps:
 i) a Zn(II)salt is dissolved in a solvent
 ii) graphite and a base are added simultaneously
 iii) the mixture is stirred under impact of ultrasound
 iv) the solvent is removed from the suspension
 or
B) (pre) the method comprises the following consecutive steps:
 i) graphite is suspended in a solvent and exfoliated via impact of ultrasound
 ii) a Zn(II)salt and a base are added simultaneously forming nano-ZnO particles
 iii) the mixture is stirred
 iv) the solvent is removed from the suspension
 or
C) (post) the method comprises the following steps:
 i) a Zn(II)salt and a base are mixed in a solvent in a first reactor forming nano-ZnO particles
 ii) graphite is exfoliated via impact of ultrasound in a second reactor
 iii) both suspensions of i) and ii) are mixed together
 iv) after step iii) the solvent is removed from the suspension, and
tempering the primary coated composite a) at a temperature in a range of 420° C. to 750° C. in an inert atmosphere or at a temperature in a range of 375° C. to 700° C. in a reducing atmosphere.

19. Method of producing a primary tempered composite b) according to claim 18, wherein for composites tempered in an inert atmosphere the temperature of tempering is in a range of 550 to 730° C. and for composites tempered in a reducing atmosphere the temperature of tempering is in a range of 375 to 550° C.

20. Method of producing a primary tempered composite b) according to claim 18, wherein the reducing atmosphere consists essentially of a mixture of inert and reducing gases and is taken from the group consisting of $N_2/H_2$ or $Ar/H_2$ mixtures or mixtures thereof.

21. Anode usable in a lithium-ion battery comprising the primary coated tempered composites b) or of secondary coated composite d) tempered in reduced atmosphere according to claim 7.

22. Lithium-ion battery comprising the anode of claim 21.

* * * * *